(12) United States Patent
Kamano et al.

(10) Patent No.: US 6,224,100 B1
(45) Date of Patent: May 1, 2001

(54) AIR BAG APPARATUS, AIR BAG FOLDING METHOD, AND AIR-BAG FOLDING DEVICE

(75) Inventors: Yoshifumi Kamano; Kazuyoshi Nishijima; Kazuhiro Kaneko; Naoki Yamamoto; Naoki Horikawa, all of Shizuoka (JP); Keiji Mochizuki, deceased, late of Shizuoka (JP), by Kumiko Mochizuki, Yoshitaka Mochizuki, Harumi Mochizuki, Naoko Mochizuki, legal representatives

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 08/913,914
(22) PCT Filed: Mar. 25, 1997
(86) PCT No.: PCT/JP97/00990
  § 371 Date: Mar. 20, 1998
  § 102(e) Date: Mar. 20, 1998
(87) PCT Pub. No.: WO97/35745
  PCT Pub. Date: Oct. 2, 1997
(51) Int. Cl.[7] .................................................. B60R 21/20
(52) U.S. Cl. ................................. 280/743.1; 280/728.1; 280/731
(58) Field of Search ............................... 280/743.1, 728.1, 280/731; 53/117, 429; 493/405

(56) References Cited

U.S. PATENT DOCUMENTS

| | | | | |
|---|---|---|---|---|
| 4,010,055 | * | 3/1977 | Oka et al. ...................... | 280/743.1 |
| 5,690,358 | * | 11/1997 | Marotzke ........................ | 280/743.1 |
| 5,899,495 | * | 5/1999 | Yamamoto et al. .............. | 280/743.1 |

FOREIGN PATENT DOCUMENTS

| | | | |
|---|---|---|---|
| 46-73935 | * | 10/1973 | (JP) . |
| 53-26889 | * | 8/1978 | (JP) . |
| 3-82647 | * | 4/1991 | (JP) . |
| 7-137591 | * | 5/1995 | (JP) . |

* cited by examiner

Primary Examiner—Eric Culbreth
(74) Attorney, Agent, or Firm—Morrison Law Firm

(57) ABSTRACT

A pouch-shaped air bag (12) is spread out in a circle. Then, the portion of the air bag (12) located outside the inflator (16) is folded into a wave-like pattern from four directions so that four side portions (61) are formed along the inflator (16). Next, each one of the four excess portions (62), which are continuously formed between each two adjacent side portions (61) and protrude outward, is placed along the outer face of each side portion (61). Thus, the air bag (12) can be easily folded compactly that can be smoothly unfolded.

6 Claims, 40 Drawing Sheets

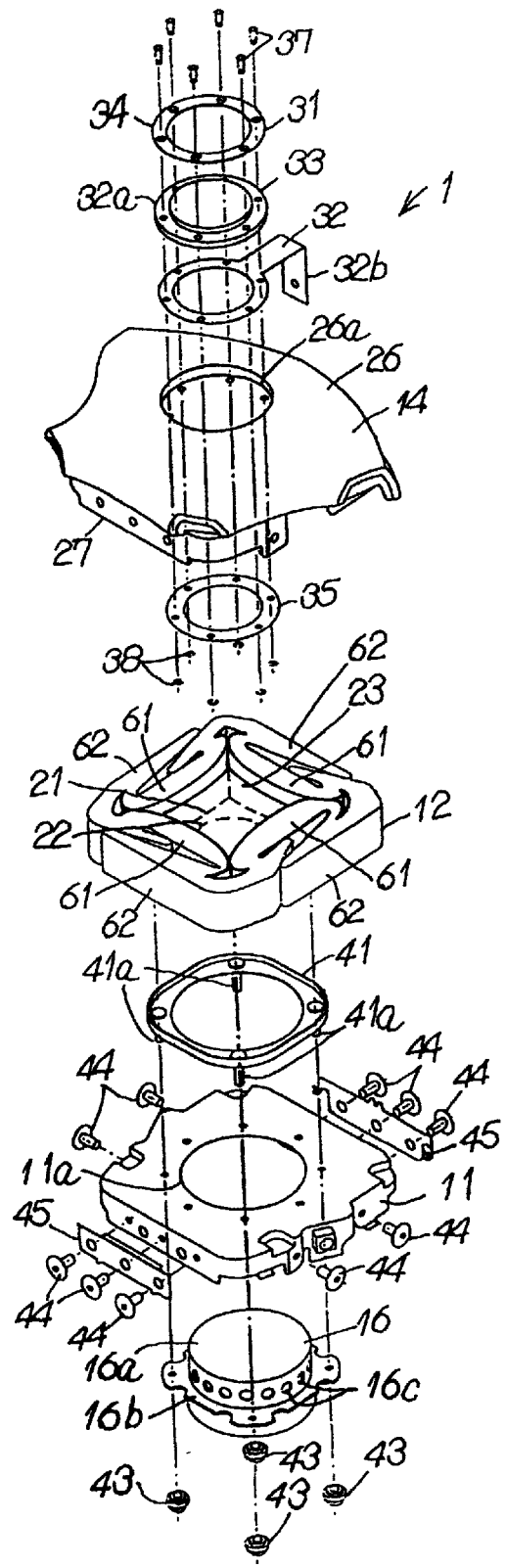
F I G. 1

(a)

(b)

(a)

(b)

(c)

(a)

(b)

AIR BAG APPARATUS, AIR BAG FOLDING METHOD, AND AIR-BAG FOLDING DEVICE

BACKGROUND ART

The present invention relates to an air bag system wherein a folded air bag is inflated and expanded by means of gas. The invention also relates to a method of folding such an air bag and an apparatus for folding the same.

An example of conventional air bag systems is an air bag system incorporated in the steering wheel of a vehicle. This air bag system essentially comprises a flat, pouch-shaped air bag, a cover that covers said air bag, and an inflator adapted to eject gas. Under normal circumstances, the air bag is folded compactly and stored in the cover. The air bag system is adapted to cause gas to be ejected from the inflator in order to inflate the air bag when a shock resulting from a collision of the vehicle is detected, so that the pressure of the expansion of the air bag tears the cover and projects the air bag towards the front of the driver, where the air bag continues to be unfolded and inflated at the same time to reduce the shock received by the driver.

An example of air bag systems of this type is disclosed in Japanese Patent Laid-open No. 137591/1995, which calls for folding an air bag into a wave-like pattern along a plurality of annular creases that coaxially surround the generally cylindrical inflator, and then compressing the air bag by pushing it toward the inflator. Thus, the air bag is folded into a given shape that can be stored in the steering wheel. An air bag system having this configuration is adapted to enable the air bag to tear the cover rapidly at a low pressure and expand smoothly.

However, the above structure offered in Japanese Patent Publication No. 137591/1995 presents problems in that the configuration of a folding apparatus used for folding an air bag tends to be complicated; it is difficult to reduce production costs of the system; and that it is not always easy to fold an air bag into a compact shape, because irregular wrinkles tend to be formed in radial and other directions when the air bag folded into a wave-like pattern is pushed and compressed.

In order to solve the above problems, the present invention relates to an air bag system which is capable of folding an air bag easily into a compact shape, as well as a method and an apparatus for folding an air bag which are capable of folding an air bag easily into a compact shape, simplifying the structure of a system, speeding up of the folding process, reducing production costs and enabling the air bag to be smoothly inflated.

An air bag system according to the present invention includes an inflator adapted to eject gas and a pouch-shaped air bag adapted to be unfolded and inflated toward an occupant of the seat equipped with the air bag system by the gas injected from said inflator, wherein said air bag includes an occupant's side portion positioned in front of the inflator, three or more side portions which are folded into a wave-like pattern, located outside the occupant's side portion and continuously connected to the same, and three or more excess portions, each of which is located between each two adjacent side portions and placed along the outer face of either or both the adjacent side portions. As the side portions at which the air bag is folded into a wave-like pattern are disposed around the outer face of the inflator according to the invention, the air bag can be smoothly unfolded and expanded toward the occupant from the occupant's side portion when gas is injected. In addition, by connecting the side portions, which are folded in a wave-like pattern, to one another through the excess portions and positioning these excess portions along the outer faces of the side portions, the device according to the invention is capable of folding the air bag compactly while arranging creases in an orderly fashion and reducing irregular wrinkles which may be formed during the folding operation. Furthermore, providing three each or more side portions and excess portions enables the air bag to be easily folded into a shape which is suitable to be housed in a space having a polygonal or circular outline. In addition, the configuration also makes it possible to inject gas smoothly and rapidly into the excess portions.

By providing each excess portion with a release line portion that extends continuously from the occupant's side portion to the end of the excess portion, the invention is capable of separating the folds that constitute each side portion from those which constitute the adjacent side portions and smoothly feeding the gas along these release line portions to the portion surrounding the outer perimeter of the inflator, so that the air bag may be smoothly inflated outward.

As the excess portions can be easily formed by winding them in a uniform direction around the outer faces of the respective side portions, the invention simplifies a folding operation.

According to another feature of the invention, an air bag system includes an inflator adapted to eject gas and a pouch-shaped air bag adapted to be unfolded and inflated by the gas injected from said inflator, wherein said air bag includes a bottom portion in which a gas inlet opening is formed, and three or more side portions which are located outside the bottom portion, integrally connected to the same and folded nearly perpendicularly to the bottom portion into a wave-like pattern, the peripheral end of each side portion placed along the outer face of the side portion. With the configuration as above, the air bag can be folded compactly into a given shape in a substantially orderly fashion. Furthermore, as three or more side portions are provided, the air bag can be easily folded into a shape which is suitable to be housed in a space having a polygonal or circular outline, and it is also possible to inject gas smoothly and rapidly into the entire air bag.

By forming the bottom portion into a generally rectangular shape, the air bag can be easily folded along the edges of the bottom portion in a substantially orderly fashion into a compact shape.

By providing a release line portion between each two adjacent side portions in such a manner that each release line portion extends continuously from the bottom portion to the outer end of the side portion, the invention is capable of separating the folds that constitute each side portion from those which constitute the adjacent side portions and smoothly feeding the gas along these release line portions to the portion surrounding the outer cylindrical face of the inflator, so that the air bag may be smoothly inflated outward.

A method of folding an air bag for an air bag system according to the invention is a method of folding an air bag adapted to be unfolded and inflated by gas flown thereinto, said method calling for folding said air bag in such a manner as to form three or more side portions, and placing each excess portion formed between each two adjacent side portions along the outer face of each side portion. By folding said air bag to form a plurality of side portions and placing each excess portion formed between each two adjacent side portions along the outer face of each side portion, the method according to the invention is capable of easily folding the air bag neatly into a shape which comprises side portions and excess portions. Furthermore, by forming three or more side portions, the air bag can be easily folded into a shape which is suitable to be housed in a space having a polygonal or circular outline, and it is also possible to inject gas smoothly and rapidly into the entire air bag.

By providing a release line portion between each two adjacent side portions in such a manner that each release line portion extends continuously from the portion into which the gas is injected to the outer end of the side portion, the invention is capable of easily folding an air bag which is adapted to be smoothly unfolded and inflated outward.

According to yet another feature of the invention, the air bag folding method calls for spreading out an air bag flatly, folding the air bag by pushing the same at a plurality of locations, from the peripheral edge towards the center while limiting the height of the folds of the air bag, and placing the portions that protrude outward along the peripheral face of the folded portion. According to the method described above, as the height of the air bag is limited, it is possible to fold the air bag into a given shape simply by pushing the spread out air bag toward the center and placing the portions protruding outward along the peripheral face of the folded portion. Therefore, the invention is capable of simplifying the process of folding an air bag, thereby reducing the time required for the process, simplifying the structure of a folding apparatus used for this process, and reducing costs for the folding operation. Furthermore, as the method calls for folding an air bag around the central portion, it permits the air bag to be smoothly and rapidly unfolded and inflated from the central portion toward the occupant, when gas flows to the central portion.

An air bag folding apparatus according to the invention includes a release line forming means to form release line portions in an air bag, each release line portion continuously extending from the portion from which gas flows into the air bag to the edge of the air bag; and a folding means adapted to fold said air bag into a wave-like pattern in the state where the release line portions are held by the release line forming means so as to form side portions folded into a wave-like pattern and excess portions extending along the release line portions. According to this configuration, release line portions continuously extending from the portion from which gas flows into the air bag to the edge of the air bag are formed by using a release line forming means, and an air bag is folded into a wave-like pattern by using a folding means in the state where the release line portions are held so that side portions folded into a wave-like pattern and excess portions respectively extending along the release line portions are formed. Therefore, by placing the excess portions along the outer faces of the side portions, an air bag which has release line portions and can be smoothly unfolded and inflated outward can be easily folded.

A compressing means for compressing the side portions that are folded into a wave-like pattern may be provided so that an air bag can be folded compactly by compressing the side portions with the compressing means.

By providing a winding means for placing the excess portions around the peripheral surface of the side portions, a folding operation of an air bag can be made more convenient.

According to yet another feature of the invention, an air bag folding apparatus includes a loading portion to permit a flatly spread air bag to be placed thereon, a pushing means for pushing the peripheral edge of the air bag toward the center, and a height restricting means for restricting the distance between the air bag and said loading means. With the configuration as above, by pushing a spread out air bag inward with a pushing means, the air bag can be folded into a wave-like pattern around the central portion while the height of the air bag is limited by the height restricting means, the portions which remain unfolded and protrude outward are wound or otherwise placed around the outer face of the folded portion so that the air bag is formed into a given shape. Thus, the invention is capable of simplifying the process of folding an air bag, thereby reducing the time required for the process, simplifying the structure of a folding apparatus used for this process, and reducing costs for the folding operation. Furthermore, as the apparatus is adapted to fold an air bag around the central portion, it permits the air bag to be smoothly and rapidly unfolded and inflated from the central portion toward the occupant, when gas flows to the central portion.

According to yet another feature of the invention, an air bag folding apparatus includes a plurality of pushing means and a radial position restricting means adapted to form lug portions by limiting the movement of the portions of the air bag which are located between each respective adjacent pushing means. With the configuration as above, by forming lug portions by using the radial position restricting means when the air bag is pushed toward its center by the pushing means, each one of said lug portions located between each two pushing means and radially protruding outward from the central portion, the apparatus is capable of neatly folding the portion of the air bag pushed by the pushing means. The apparatus is also capable of folding the air bag easily into a given shape by winding or otherwise placing the lug portions around the peripheral surface of the folded portion.

According to yet another feature of the invention, an air bag folding apparatus includes a winding means for winding the portions which protrude outward around the peripheral surface of the folded portion. With the configuration as above, by winding the portion which protrude out of the folded portion around the peripheral surface of the folded portion, the apparatus is capable of folding the air bag easily into a given shape.

According to yet another feature of the invention, an air bag folding apparatus includes an insertion means adapted to insert a folded air bag into a cover for storing said air bag therein. With the configuration as above, as there is no need of a special structure for maintaining the folded shape, the above configuration enables the folding operation to be completed quickly and simplifies the production of an air bag system using an air bag prepared as above.

BRIEF DESCRIPTION OF DRAWINGS

FIG. 1 is an exploded perspective view of an air bag system according to an embodiment of the present invention;

Further.

BEST MODE FOR CARRYING OUT THE INVENTION

Next, the configuration of an embodiment of the present invention is explained hereunder, referring to the attached drawings.

Figure 2:
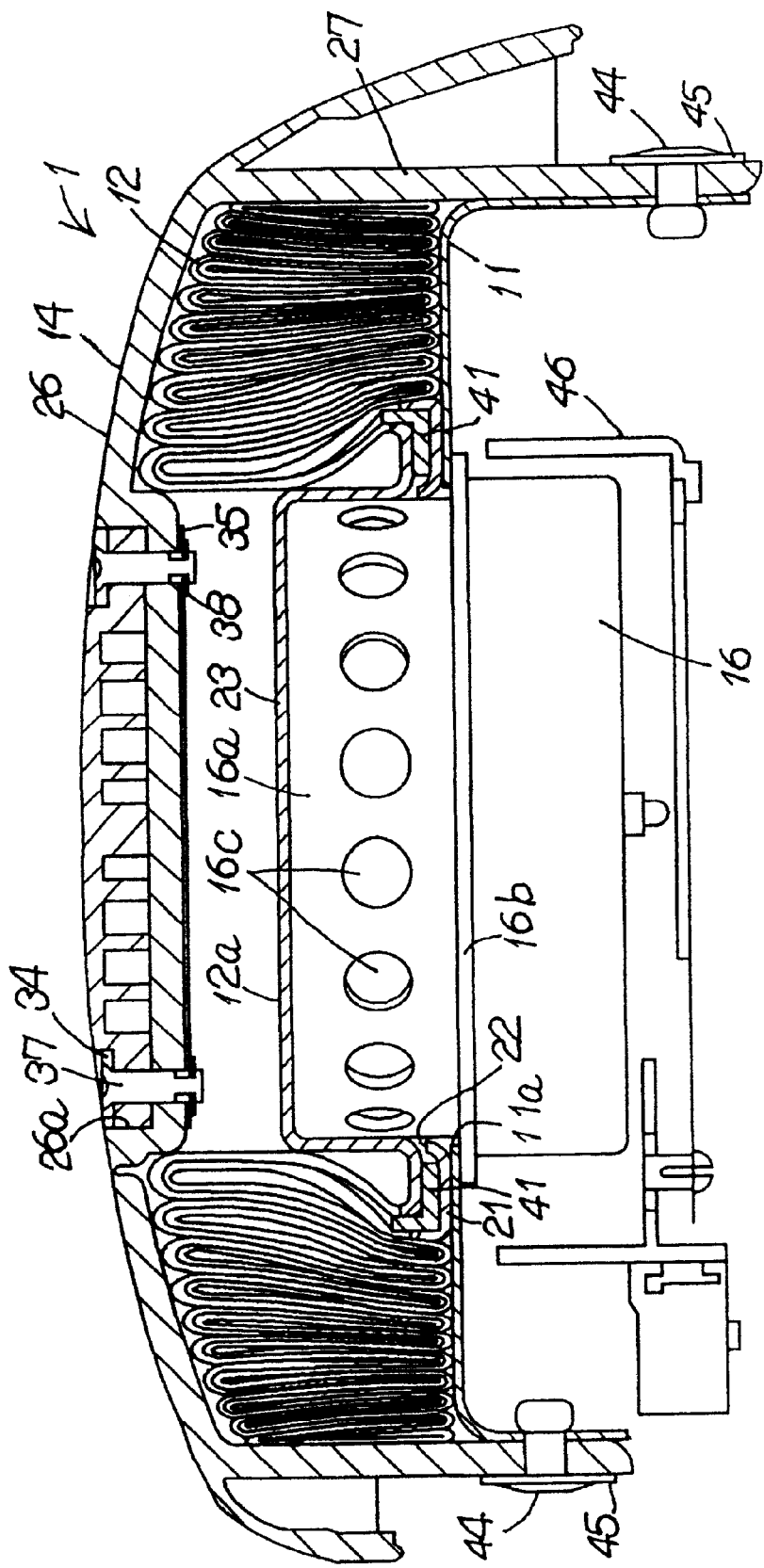
FIG. 2 is a sectional view of said air bag system.
Figure 3:
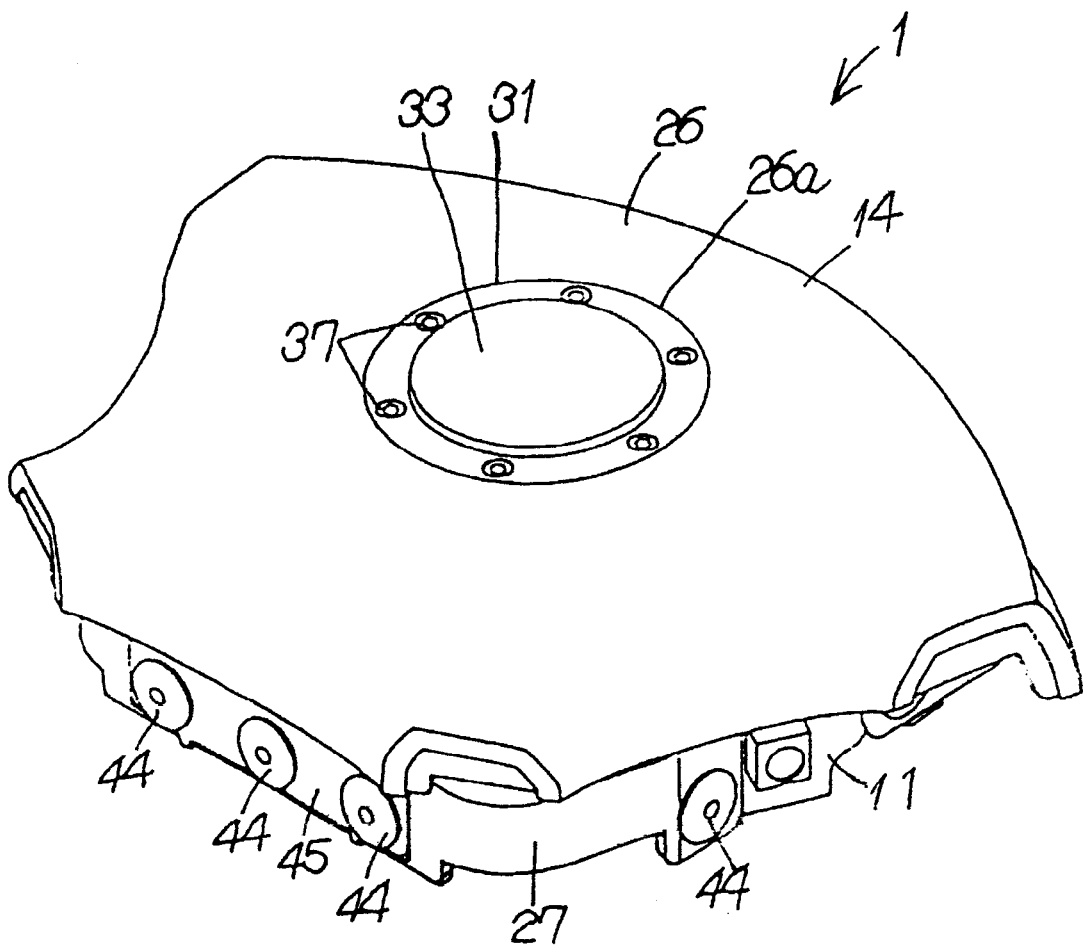
FIG. 3 is a perspective view of said air bag system.

Referring to FIGS. 1 to 3, numeral 1 denotes an air bag system, which is mounted on a boss portion at the center of the body of the steering wheel of a vehicle so as to protect a passenger of the vehicle (the driver in case of this embodiment) from the shock of a collision. The steering wheel is normally mounted in such a manner as to be capable of tilting within a specified range and normally used at an angled position. In the explanation hereunder, the side of the air bag system 1 that faces the driver or the person seated at the seat equipped with the air bag system is referred to as the upper side or the occupant's side, while the bottom side of the air bag system 1 that faces the body of the vehicle is referred to as the lower side. Further, unless otherwise specified, the side or the portion of the air bag system 1 facing toward the upper front part of the vehicle, i. e. the side facing toward the windshield, is referred to as the front side or the front portion, while the side or the portion of the air bag system 1 facing toward the lower rear part of the vehicle is referred to as the rear side or the rear portion.

The air bag system 1 essentially comprises a base plate 11 made of a flat rectangular metal and adapted to be attached to the body of the steering wheel, a pouch-shaped air bag 12 to be folded and disposed on the base plate 11 in the folded state, a cover (a modular cover) 14 to be attached to the base plate 11 in such a manner as to cover the air bag 12 from above, and an inflator 16 adapted to be attached to the base plate 11 from underneath the base plate and feed gas into the air bag 12.

More precisely, the inflator 16 comprises a generally cylindrical main body 16a, which is provided with a flange portion 16b formed around the outer cylindrical surface of the main body 16a and a plurality of gas ejection holes 16c for injecting gas, which are formed at specified intervals around the outer cylindrical surface of the main body 16a, above the flange portion 16b.

The air bag 12 is formed by sewing the perimeters of a pair of fabric materials or plies 12a, 12b together along their circular outlines so that the bag is in the shape of a two ply disk when it is spread flat. The air bag has a shape resembling a flattened ball when it is expanded by a gas flow entry thereto. The underside ply of the air bag has a center portion 21 in which a gas inlet opening 22 in the shape of a circular hole is formed, while the upper side ply defines an occupant's side portion 23.

The cover 14 is formed as an integral body by means of, for example, injection molding of synthetic resin and comprises a cover portion 26 and mounting wall portions 27 extending downward from the back face of the cover portion 26. Said cover portion 26 is adapted to cover the boss portion and a part of the four spoke portions. A horn switch mechanism 31 is attached to the cover 14. This horn switch mechanism 31 includes a membrane switch 32, a center pad 32a, an upper ring 34 and a lower ring 35, wherein the membrane switch 32, the center pad 32a and the upper ring 34 are adapted to be disposed in a recess 26a formed in the top of the cover portion 26, and the lower ring 35 and disposed at the underside of the cover portion 26. These members are fastened to the cover portion 26 by means of a plurality of shafts 37, which are inserted from above through these members, and O-rings 38 disposed under the lower ring 35 and respectively fitted around the shafts 37. The membrane switch 32 is provided with a sheet-like switch body 33 whose contact point is closed when it is deformed, and a connector piece portion 32b so formed as to extend from the switch body 32 and to be positioned along the inner surface of a mounting wall portion 27. Further, the center pad 32a, upper ring 34 and/or the shafts 37 may be decorated with, for example, an ID mark so as to be used as ornamental members.

In the air bag system 1 described above, the air bag 12 is disposed on the base plate 11 in such a manner that the gas inlet opening 22 is positioned to an inflator mounting hole 11a of the base plate 11 by using a generally rectangular annular retainer 41 and rivets (not shown) or the like. The inflator 16 is disposed by inserting the main body 16a upward through the inflator mounting hole 11a into the gas inlet opening 22 so that bolts 41a projected from the retainer 41 pierce through the flange portion 16b. Then, by fitting nuts 43 from underneath around the respective bolts 41a and tightening the nuts in the above state, the air bag 12 and the inflator 16 are mounted on the base plate 11 with the air bag 12 and the base plate 11 secured between the retainer 41 and the flange portion 16b of the inflator 16. In the state where the air bag 12 folded into a specified shape is covered by the cover 14, the mounting wall portions 27 of the cover 14 are respectively fastened to the sides of the base plate 11 with rivets 44. These rivets 44 are fastened to the mounting wall portions 27 that are respectively provided at the front and rear ends of the cover, with assist plates 45 disposed between the mounting wall portions 27 and the rivets 44 and thus engaged with the respective mounting wall portions 27. Then, by attaching an inflator cover 46 to the underside of the inflator 16, the assembly of the air bag system 1 is completed.

When a vehicle equipped with an air bag system 1 having the above structure receives a shock resulting from a collision of the vehicle or the like, an igniter of the inflator 16 is actuated by signals from a collision detecting unit (not shown) or the like to cause reaction of a propellant filling the inflator so that gas is instantaneously ejected through the gas ejection holes 16c formed around the outer wall of the inflator 16 into the air bag 12. As a result, the air bag 12 is rapidly inflated and unfolded, and the pressure of the expansion tears the cover 14 along a tear line which is so formed in the cover as to be weaker than the remaining part of the cover, thereby forming a breakthrough opening for the air bag 12. In that state, the air bag 12 projects from this opening and continues to be unfolded and inflated at the same time in front of the driver so as to protect the driver from the shock of the collision.

Next, the procedure of folding the air bag 12 is explained referring to the drawings.

Figure 4:
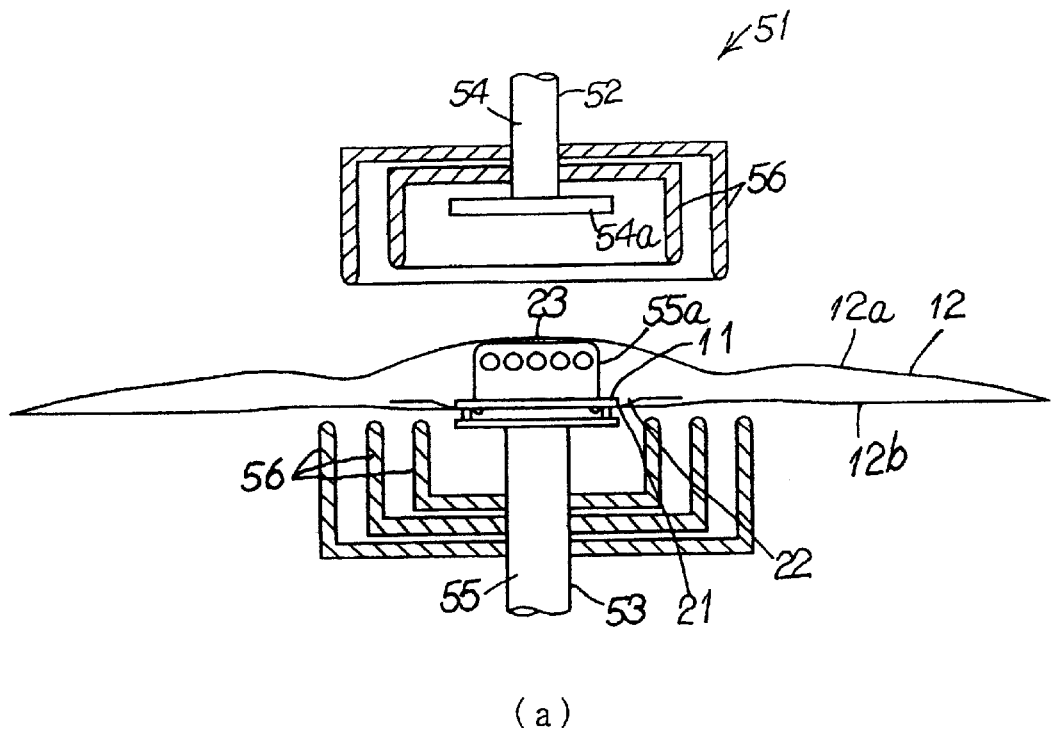
FIG. 4 is a schematic illustration to explain the method of folding said air bag.
Figure 4:
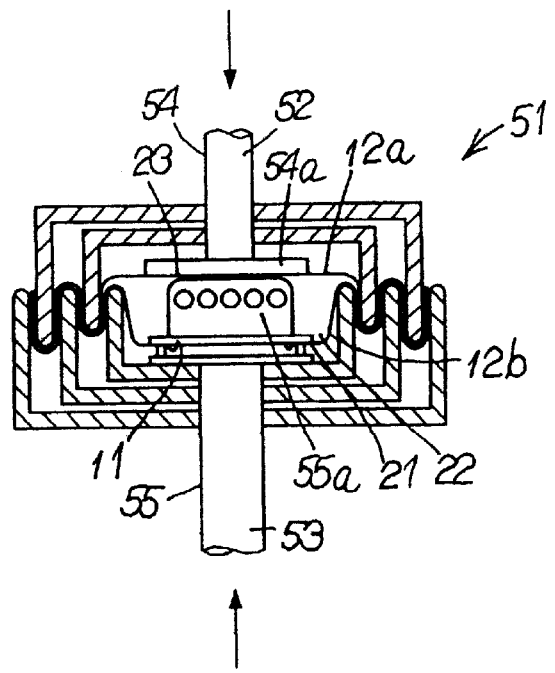

First of all, as shown in FIG. 4, a folding apparatus 51 used for the folding operation includes an upper folding mold 52 and a lower folding mold 53 which are adapted to move towards and away from each other. The upper and lower folding molds 52 and 53 are respectively provided with pistons 54,55. While the lower piston 55 has a lower plug 55a that resembles the shape of the inflator 16, the upper piston 54 has an upper plug 54a to be pressed against the upper surface of the lower plug 55a. Each one of the folding molds 52,53 also has a plurality of folding plates 56 which may be cylindrical or square tubes or plates so disposed as to coaxially surround the upper plug 54a or the lower plug 55a and supported in such a manner as to be capable of advancing and retreating independently of the upper and lower pistons 54,55. As shown in FIG. 4(b), the folding plates 56 are so structured that the upper and lower folding plates 56 are alternately arranged when the upper and lower folding molds 52,53 are close to each other.

As shown in FIG. 4(a), the air bag 12 attached to the base plate 11 is spread into a flat circle and placed on the piston 55 of the lower folding mold 53 in the state where there is a sufficient distance between the upper and lower folding molds 52,53. In this state, the upper and lower folding molds 52,53 are brought closer to each other so that the upper and lower folding plates 56 are alternately arranged from the innermost plates to the outermost plates. As a result, the spread air bag 12 is folded into an annular wave-like shape with the gas inlet opening 22 at the center, wherein the portion located outside the inflator 16 is folded in the direction perpendicular to the bottom portion 21 in which the gas inlet opening 22 is formed so that the surfaces of the fabric materials 12a,12b extend vertically along the outer surface of the inflator 16 and bent at the upper and lower ends. In this state, the occupant's side portion 23 formed of the fabric material 12a is located on the upper surface of the inflator 16.

Figure 5:
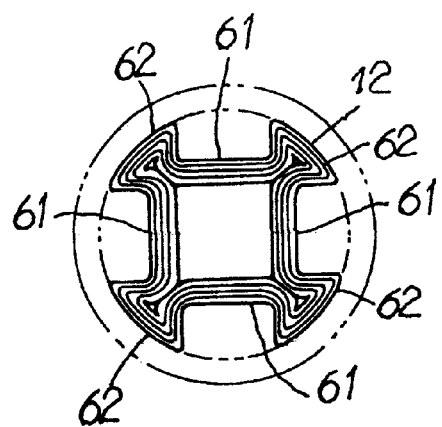
FIG. 5 is a top view of the air bag to explain said folding method.

Next, the upper and lower folding molds 52,53 are moved away from each other, and, if necessary, the air bag 12 folded in the wave-like shape is removed from the folding apparatus 51. Then, by means of a jig (not shown) or by hand of an operator, the air bag 12 is pushed inward from four directions into a shape shown in FIG. 5, wherein a side portion 61 having a generally rectangular outline is formed at each one of the four sides, with the portion between each two adjacent side portions 61 serving as an excess portion (a lug) 62 protruding out of the side portions 61.

Figure 6:
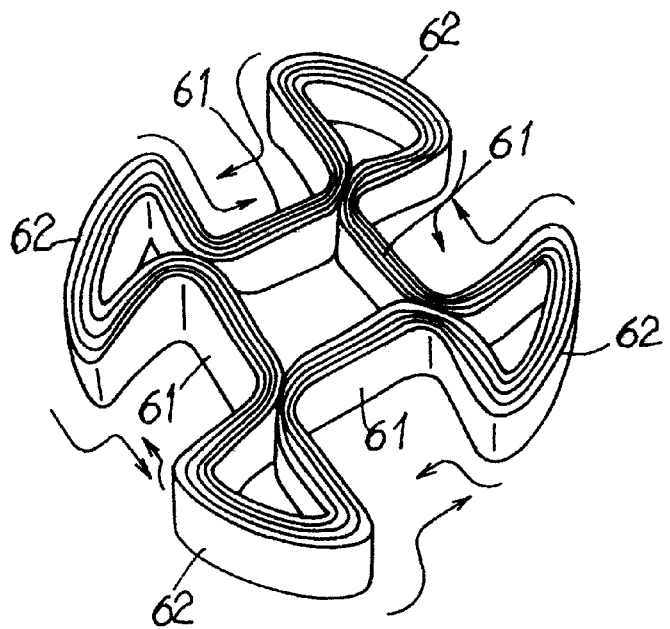
FIG. 6 is a perspective view of the air bag to explain said folding method.
Figure 7:
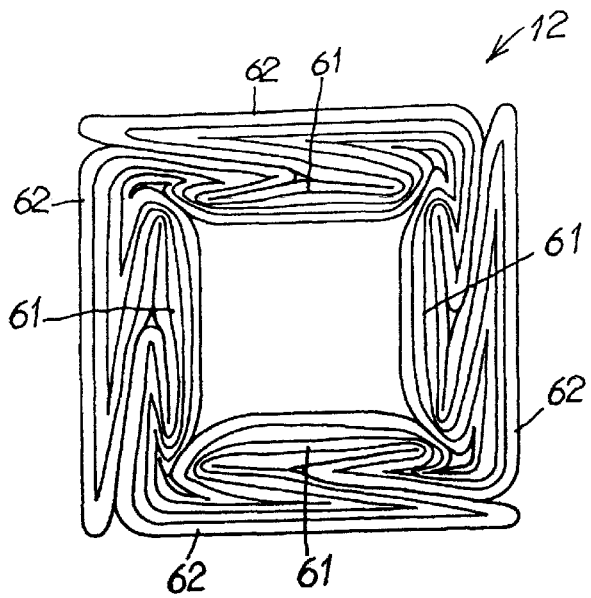
FIG. 7 is a top view of the air bag in the folded state.
Figure 8:
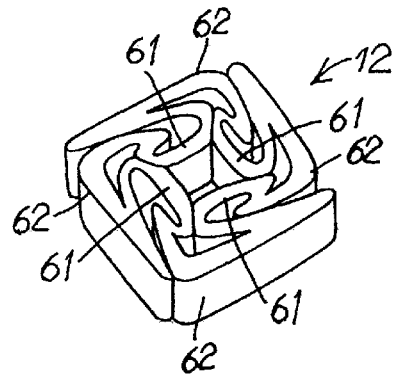
FIG. 8 is a perspective view of the air bag in the folded state.

Thereafter, as shown in FIG. 6, by means of a jig (not shown) or by hand of an operator, each excess portion 62 is flattened so that its horizontal outline is in a generally rectangular shape having a part wound along the outer face of one of the adjacent side portions 61 and the remaining part placed along the outer face of the other side portion 61. Thus, the air bag 12 is folded in an orderly fashion into a specified shape such as the one that fits to the shape defined by the mounting wall portions 27 of the cover 14. In case of this embodiment, the air bag is folded in a shape having a rectangular plan outline when viewed from the top as shown in FIG. 7, and as seen as well from perspective view FIG. 8.

As described above, according to the structure of the present embodiment, a plurality of side portions 61 that consist of the portions of the air bag 12 folded into a wave-like pattern are wound around the outer face of the inflator 16 in a shape resembling flower petals so that only the occupant's side portion 23, which consists of a single fabric material, i. e. the fabric material 12*a,* of the air bag 12 is positioned on the inflator 16. Therefore, when gas is injected from the inflator 16, the gas is smoothly directed to the inside area of the occupant's side portion 23, so that the air bag 12 can be smoothly unfolded and expanded forward from the occupant's side portion 23 at the initial stage of the expansion. Therefore, the system according to the present embodiment is capable of smoothly tearing the tear line of the cover 14 and projecting the air bag 12 without the need of unnecessarily high pressure for injection gas.

By connecting the side portions 61 formed by folding the fabric into a wave-like shape by way of the excess portions 62 and placing these excess portions 62 along the outer faces of the side portions 61, it is possible to fold the air bag 12 into a desired compact shape while preventing wrinkles from being formed in radial or other irregular direction and arranging creases in an orderly fashion. Thus, the embodiment is capable of providing a compact air bag system 1, wherein the air bag 12 can be rapidly and smoothly inflated in the radial direction after the air bag 12 projects from the cover 14, and also capable of increasing the durability of the air bag system.

Especially when folding an air bag 12 into a shape having a rectangular outline when viewed from the top, it is easy to fold the air bag 12 compactly in an orderly fashion along the edges of the rectangular bottom portion 21.

Furthermore, providing three each or more side portions 61 and excess portions 62 enables the air bag to be easily folded into a shape which is suitable to be housed in a space having a polygonal or circular outline. In addition, the configuration also makes it possible to inject gas smoothly and rapidly into the excess portions 62.

As a major portion of the air bag 12 is disposed at the sides of the inflator 16 with only the occupant's side portion 23 consisting of a single fabric material 12*a* positioned on the inflator 16, it is possible to form a space above the occupant's side portion 23 and dispose a horn switch mechanism 31 for blowing the horn in this space. As there is no need of a particularly thin horn mechanism, the invention according to the embodiment is effective in improving reliability of the switch and reducing the man-hours of an assembly operation. In addition, compared with a structure which calls for supporting an entire air bag system in such a manner that the air bag system can be vertically moved via a horn switch or other similar structures, the embodiment facilitates mounting of the air bag system on the body of a steering wheel with increased precision and with an improved appearance.

Although the invention is explained as above referring to the embodiment which calls for the folding apparatus 51 including an upper folding mold 52 and a lower folding mold 53, each of which is provided with a plurality of cylindrical folding plates 56, the folding plates of the upper and lower folding molds 52,53 may be of various shapes so that the air bag 12 folded into a wave-like pattern may have various outlines. For example, the upper folding mold 52 and the lower folding mold 53 may each have four folding plates in the shape of a flat rectangular plate or, in addition to the four flat rectangular plates, four curved folding plates which also form excess portions 62 at the same time. Furthermore, in the explanation of other embodiments hereunder, the elements similar to those of the first embodiment are identified with same reference numerals, of which explanation is omitted.

Figure 9:
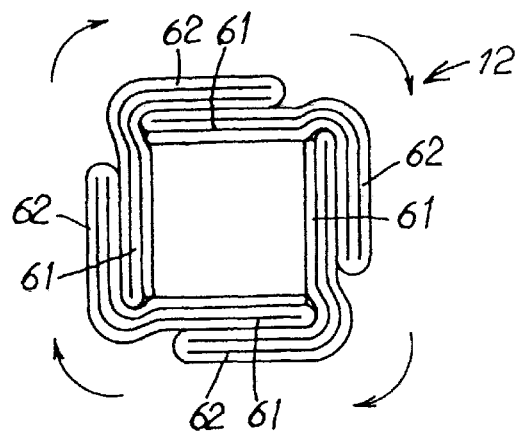
FIG. 9 is a schematic illustration to explain the method of folding an air bag according to a second embodiment of the invention.

According to the above embodiment, each excess portion 62 is placed along the outer faces of the two adjacent side portions 61. However, as in a second embodiment shown in FIG. 9, each excess portion 62 is placed along the outer face of only one of the two adjacent side portions 61.

According to the above embodiment, four side portions 61 are formed so that the final folded shape of the air bag has a generally rectangular outline when viewed from the top. However, the air bag may be folded into various shapes with a desired number of side portions 61 in order to match the shape of the air bag with the design or the cover 14 or for any other purposes.

Figure 10:
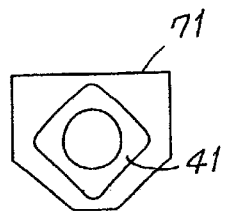
FIG. 10 is a top view of a part of an air bag system according to a third embodiment of the present invention.
Figure 11:
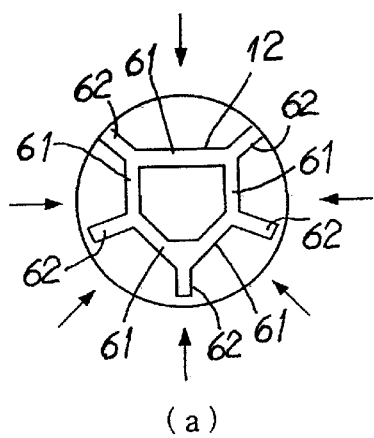
FIG. 11 is a schematic illustration to explain said air bag folding method according to the third embodiment.
Figure 11:
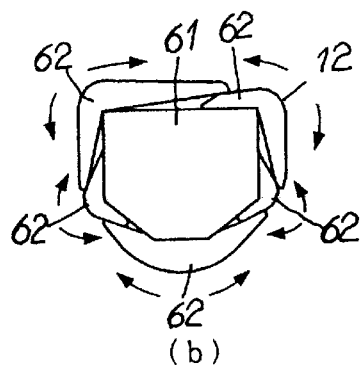
Figure 11:
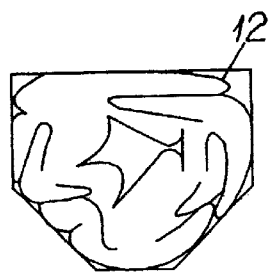
Figure 12:
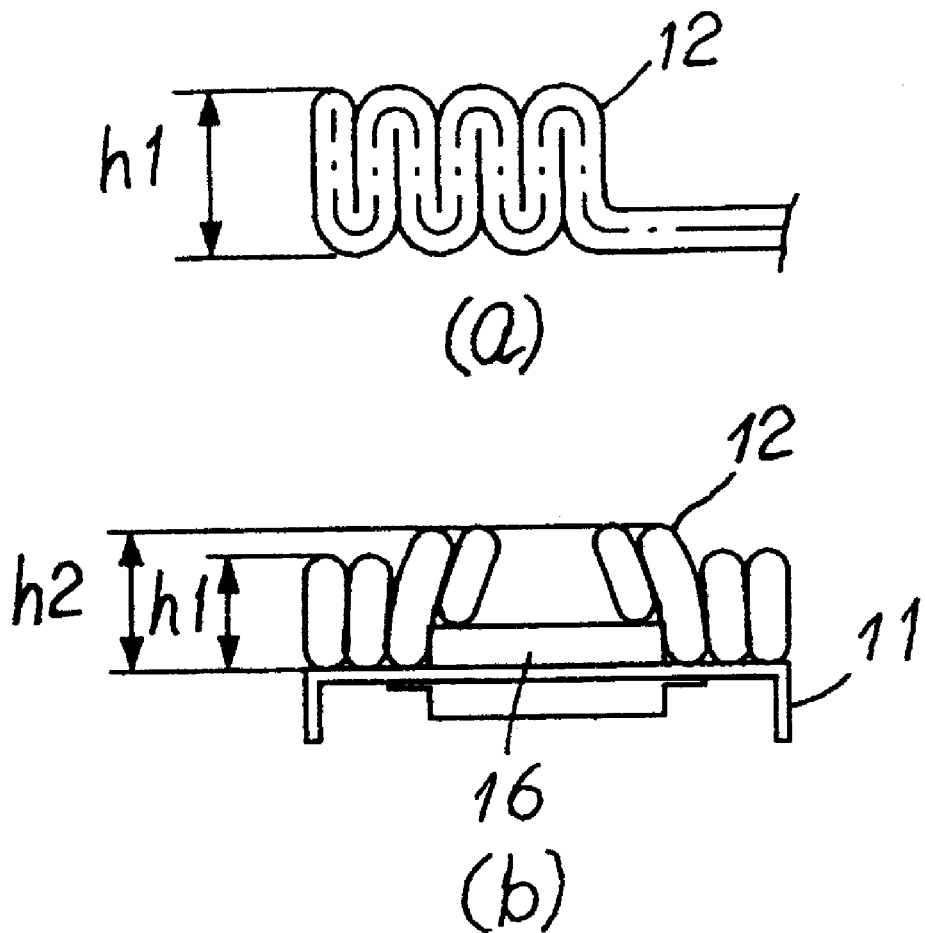
FIG. 12 is a schematic illustration of said air bag system according to the third embodiment.

For example, in cases where a pentagonal base plate 71 is used in combination with a steering wheel having three spoke portions as in a third embodiment shown in FIGS. 10 to 12, an air bag 12 is secured by means of a retainer 41 that has four corner portions, one each at the front and rear and at the two lateral ends. After being folded into a wave-like shape by means of a jig, the air bag 12 is pushed from the direction of the outline as shown in FIG. 11(*a*), so that five each side portions 61 and excess portions 62 are so formed as to match the shape of the base plate 71. Then, as shown in FIG. 11(*b*), both excess portions 62 at the front end and the one at the rear end are placed along the outer surface, and the excess portions 62 at both sides are forced underneath said three excess portions 62 and placed along the side portions 61. The two excess portions 62 at the front end are then arranged in such a manner that one of them overlaps the outer face of the other. Thus, the air bag 12 is folded into a generally pentagonal shape as shown in FIG. 11(*c*) so as to be snugly placed on the base plate 71. In this embodiment, the side portions 61 consist of four folds as shown in FIG. 12(*a*), each fold having a height h1 of 35 mm. Furthermore, as shown in FIG. 12(*b*), a part of the side portions 61 are positioned on the top of the inflator 16, and the folds of this portion has a height h2 of 50 mm.

Figure 13:
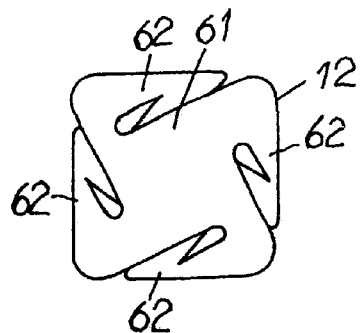
FIG. 13 is a top view of an air bag folded according to a fourth embodiment of the invention.
Figure 14:
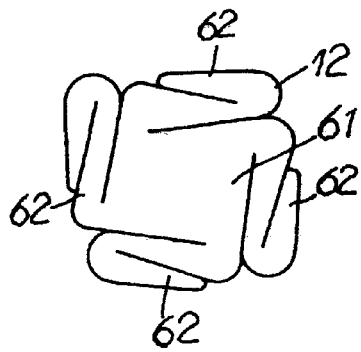
FIG. 14 is a top view of an air bag folded according to a fifth embodiment of the invention.
Figure 15:
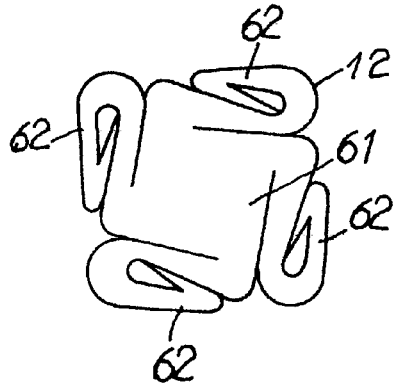
FIG. 15 is a top view of an air bag folded according to a sixth embodiment of the invention.
Figure 16:
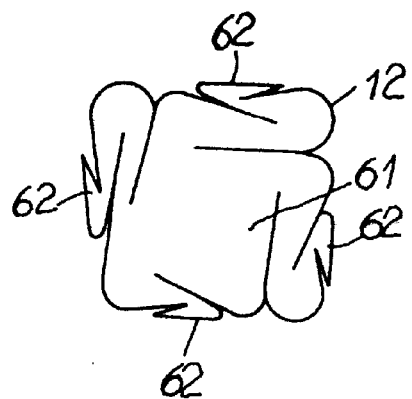
FIG. 16 is a top view of an air bag folded according to a seventh embodiment of the invention.

Other than being simply wound around the side portions 61, each one of the excess portions 62 to be placed along the outer faces of the side portions 61 may be done so in various manners; for example, as in a fourth embodiment shown in FIG. 13, each excess portion 62 may be placed along a side portion 61 with the end of the excess portion folded inward once; or, as in a fifth embodiment shown in FIG. 14, with the end of the excess portion folded outward once; or once outward and then inward as in a sixth embodiment shown in FIG. 15; or, as in a seventh embodiment shown in FIG. 16, the excess portion 62 may be placed along a side portion 61 by being folded into a wave-like shape with the end thereof folded outward twice.

Figure 17:
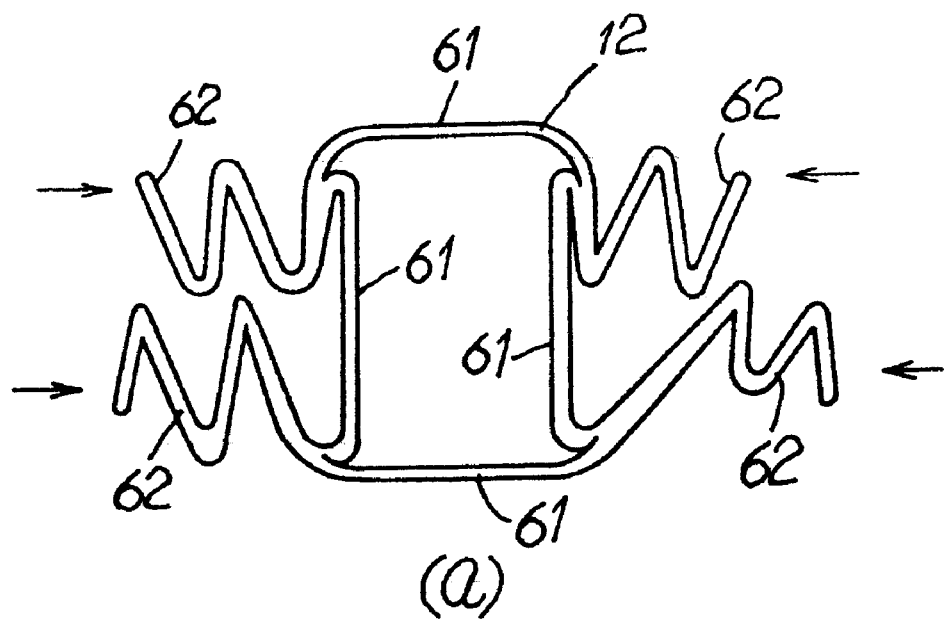
FIG. 17 is a top view of an air bag folded according to an eighth embodiment of the invention.
Figure 17:
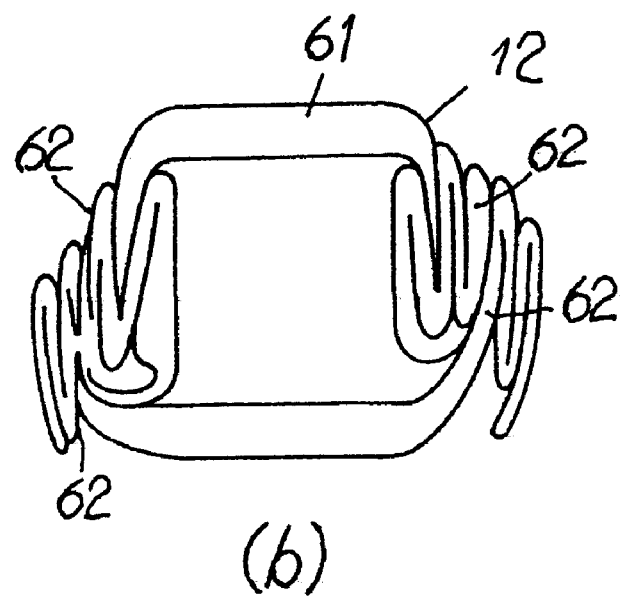

Furthermore, when folding an air bag 12 into a shape having a rectangular outline when viewed from the top, the four excess portions 62 may be bent into waves and placed along the outer faces of the side portions 61 at both sides as in an eighth embodiment shown in FIG. 17.

Figure 19:
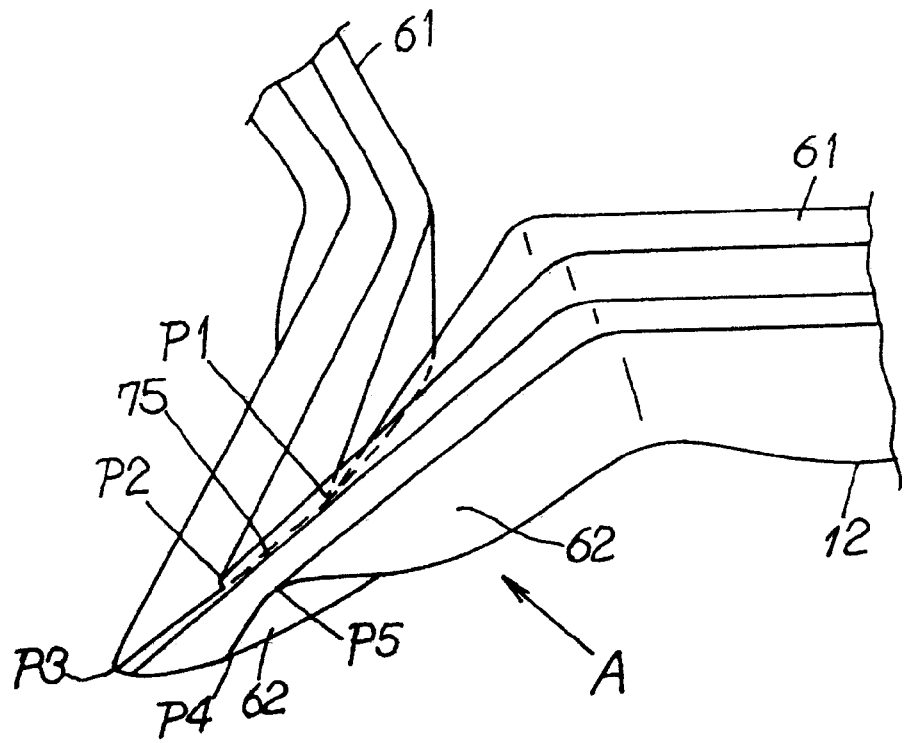
FIG. 19 is a perspective view of a part of the air bag to explain the method of folding said air bag according to the ninth embodiment.
Figure 20:
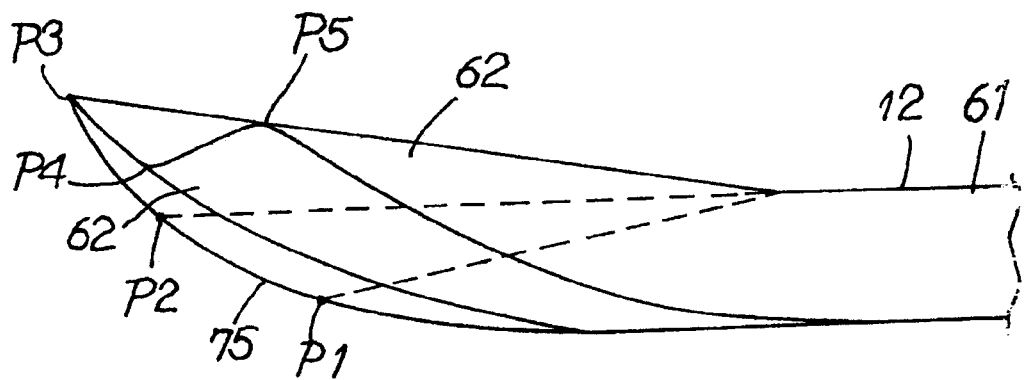
FIG. 20 is a sectional view of said air bag system according to the ninth embodiment of the invention viewed from the direction A in FIG. 19 to explain the method of folding the same.

When an air bag 12 spread out in a circle is folded according to the configurations of the embodiments described above, annular continuous creases are first formed around the inflator 16, and side portions 61 and excess portions 62 are then formed by dividing these annular creases with the creases that are perpendicular thereto. However, said creases are not limited to be annular continuous creases; as in a ninth embodiment shown in FIGS. 18 to 20, each crease may be divided into a plurality of separate portions during or after the folding operation.

Next, the folding procedure according to said ninth embodiment is explained hereunder referring to the drawings.

Figure 21:
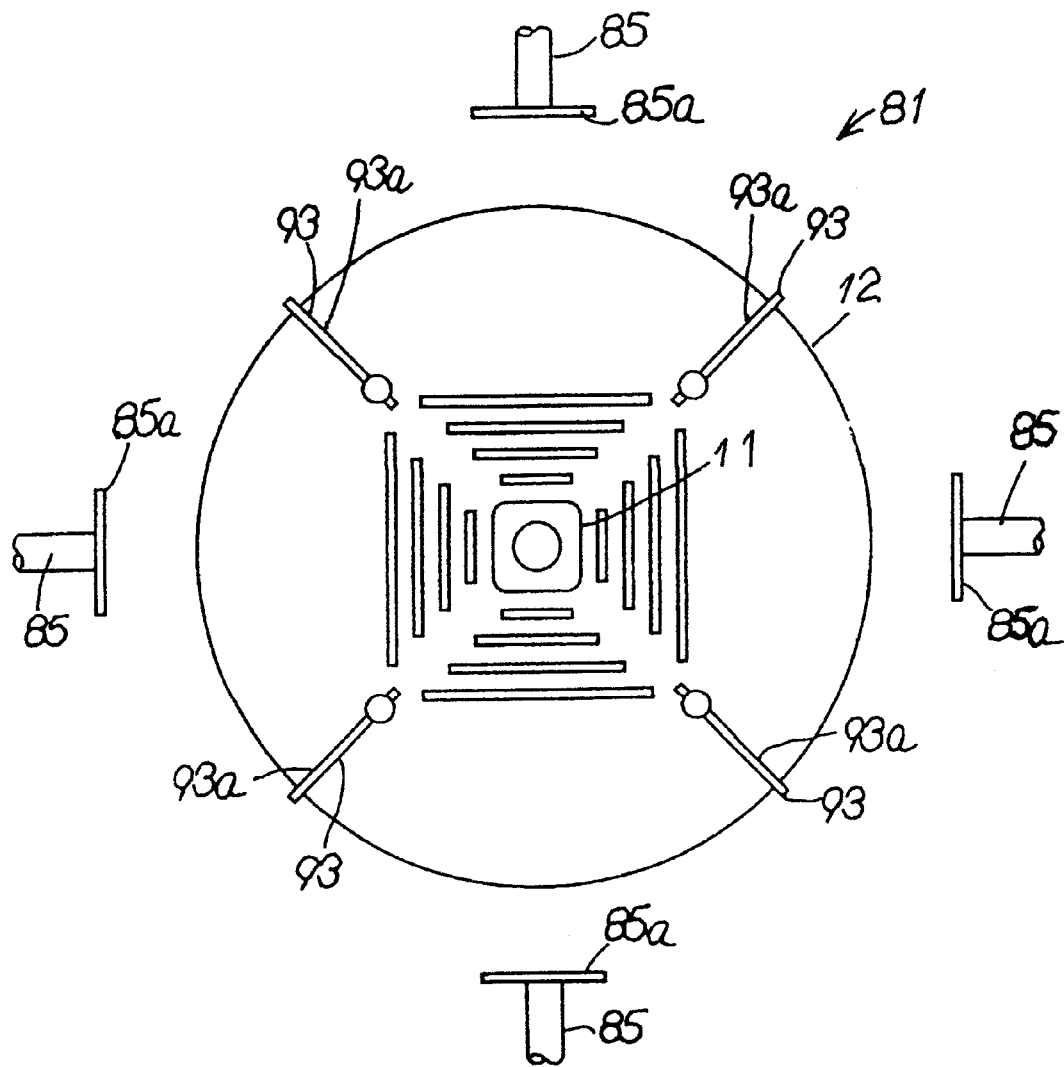
FIG. 21 is a schematic illustration of an apparatus used to fold the air bag according to the ninth embodiment of the invention.
Figure 22:
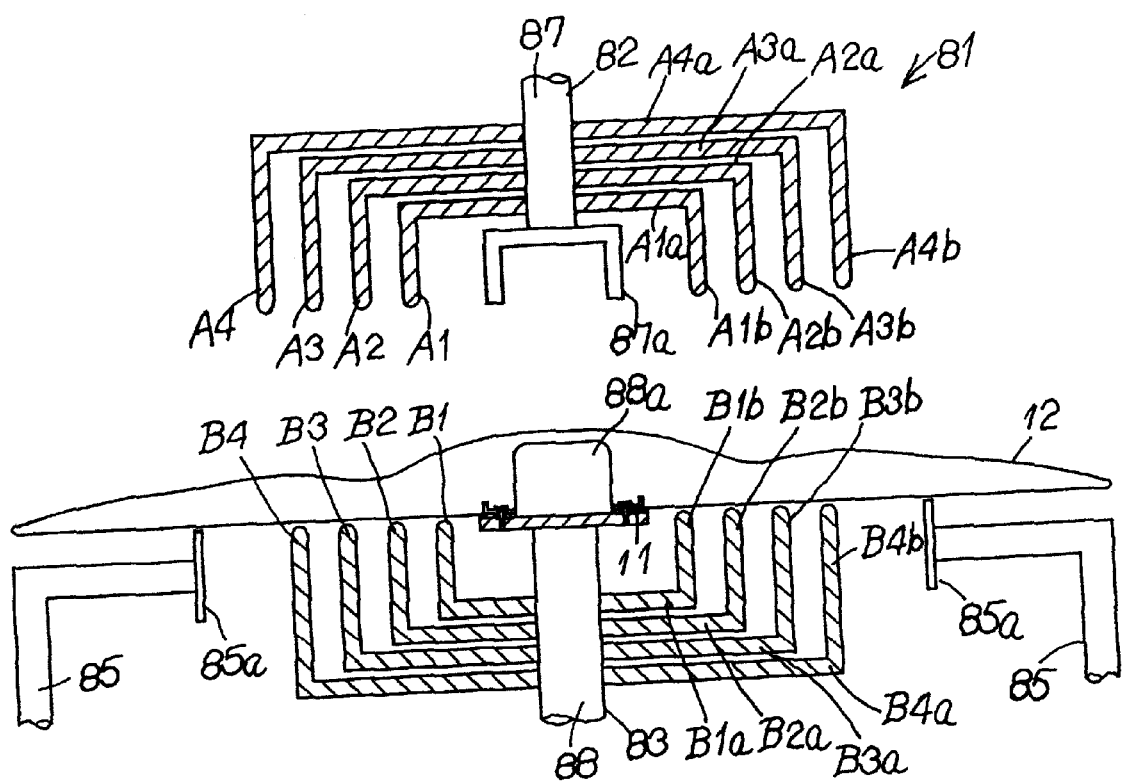
FIG. 22 is a schematic illustration to explain the procedure of folding said air bag according to the ninth embodiment of the invention.
Figure 25:
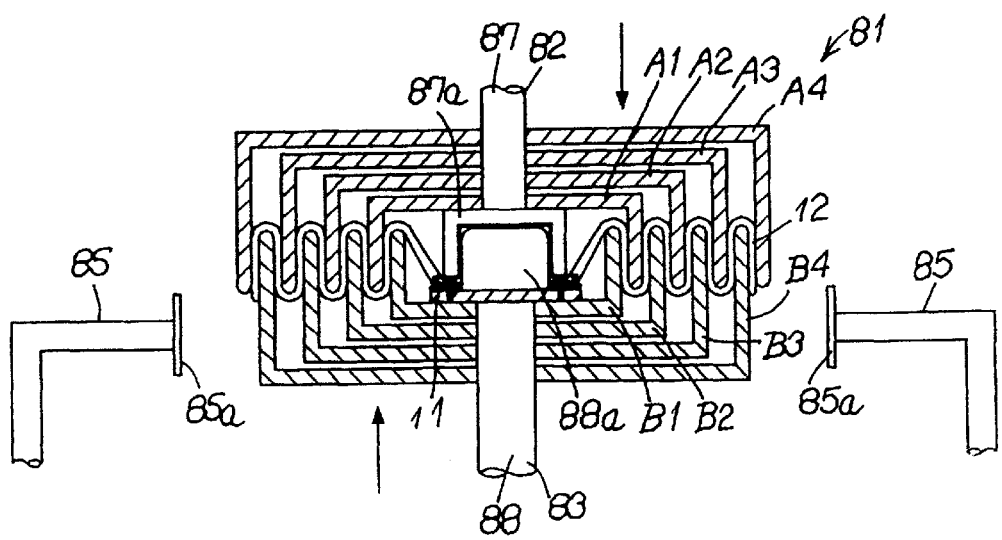
FIG. 25 is a schematic illustration to explain the procedure of folding the same.
Figure 33:
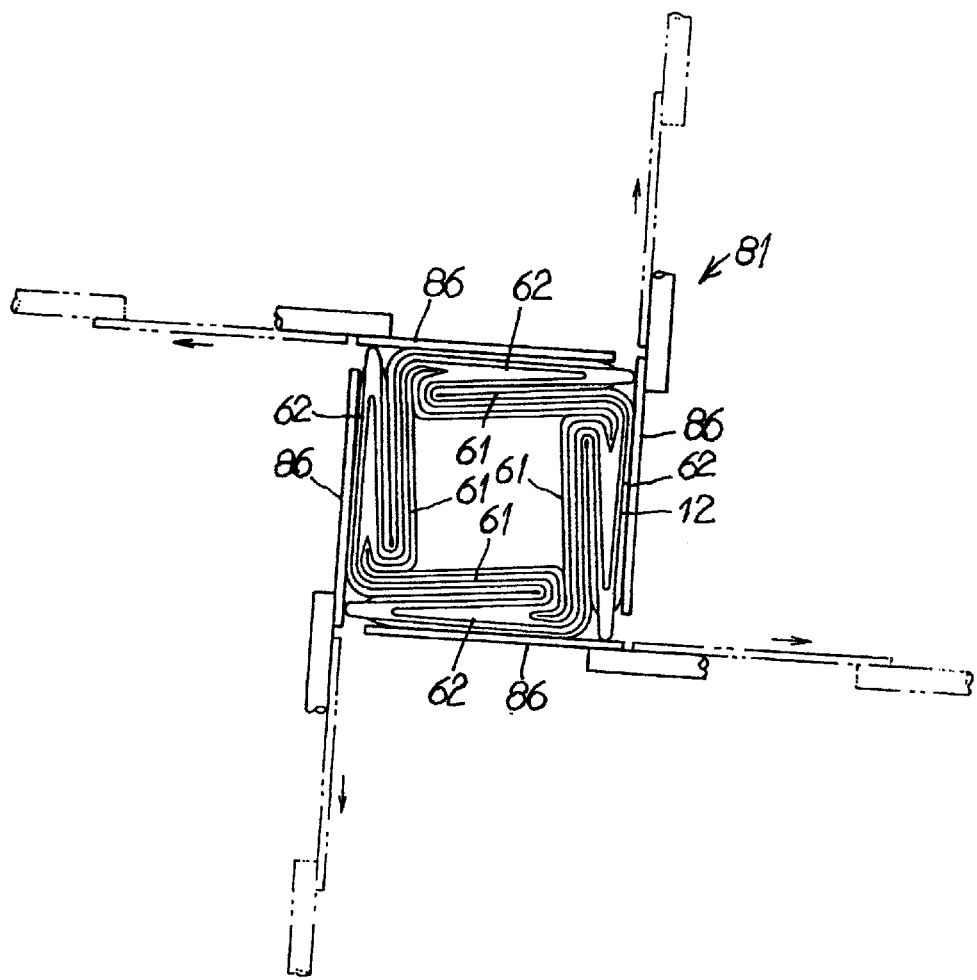
FIG. 33 is a schematic illustration to explain the procedure of folding the same.

First of all, as shown in FIGS. 21 and 22, a folding apparatus 81 used for the folding operation includes an upper jig 82, a lower jig 83, pushing jigs 85 serving as a crimping means, and winding jigs 86 serving as a winding means shown in FIG. 33, the upper jig 82 and the lower jig 83 vertically arranged, and each pushing jig 85 disposed to a side of the lower jig 83. The upper and lower jigs 82 and 83 are respectively provided with pistons 87,88. While the lower piston 88 has a lower plug 88a having a shape resembling the inflator 16, the upper piston 87 has an upper plug 87a to be loosely fitted over the lower plug 88a and pushed against the upper surface thereof. The upper jig 82 also has four folding members A1 through A4 which constitute a folding means and so arranged as to cover the upper plug 87a from above. The lower jig 83 is provided with four folding members B1 through B4 which constitute a folding means and so arranged as to cover the lower plug 88a from underneath. These folding members A1 through B4 are independently moved up and down by means of a drive unit or drive units such as air cylinders (not shown). As shown in FIG. 22, the folding members A1 through B4 respectively include horizontally arranged base plate portions A1a to B4a in the shape of a rectangular plate, each base plate from A1a to B4a having folding plates A1b through B4b which vertically extend from the four horizontal ends of the base plate. The folding plates A1b through B4b are so arranged that the upper folding plates and the lower folding plates are alternately positioned as shown in FIG. 25 when the folding members A1 through B4 are close to one another. Furthermore, as can be understood with reference to FIGS. 22 and 27, the folding plates A1b through B4b are adapted to support the shape of the folded side portions 61 until excess portions 62 are placed along the outer faces of the side portions 61.

Figure 24:
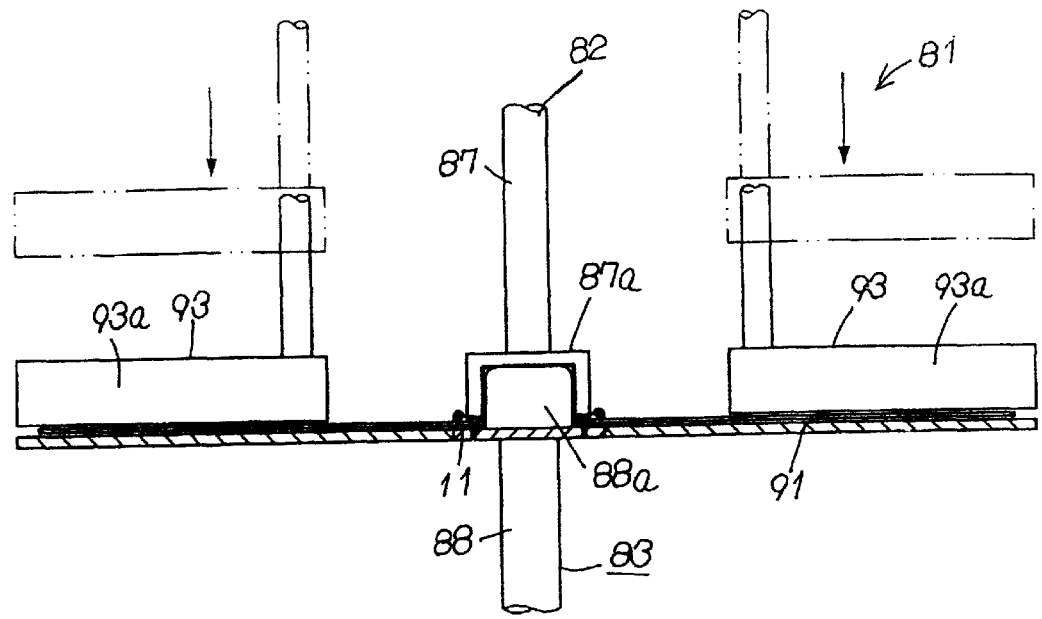
FIG. 24 is a schematic illustration to explain the procedure of folding the same.

The lower jig 83 includes an air bag loading portion 91 shown in FIG. 24, on which the spread out air bag 12 may be placed. The air bag loading portion 91 is formed over the area excluding, at least, the portion facing the lower folding plates B1b through B4b.

The upper jig 82 is provided with four release line forming members 93 adapted to be driven in the vertical direction and serve as release line forming means. Each release line forming member 93 includes a release line forming plate 93a which is disposed between two adjacent folding plates A1b through B4b and stands on one of the lengthwise sides, along a diagonal line of the base plate 11. The release line forming plates 93a are arranged in such a manner that their lower ends face the upper surface of the air bag loading portion 91, at a minimal distance therefrom.

Figure 27:
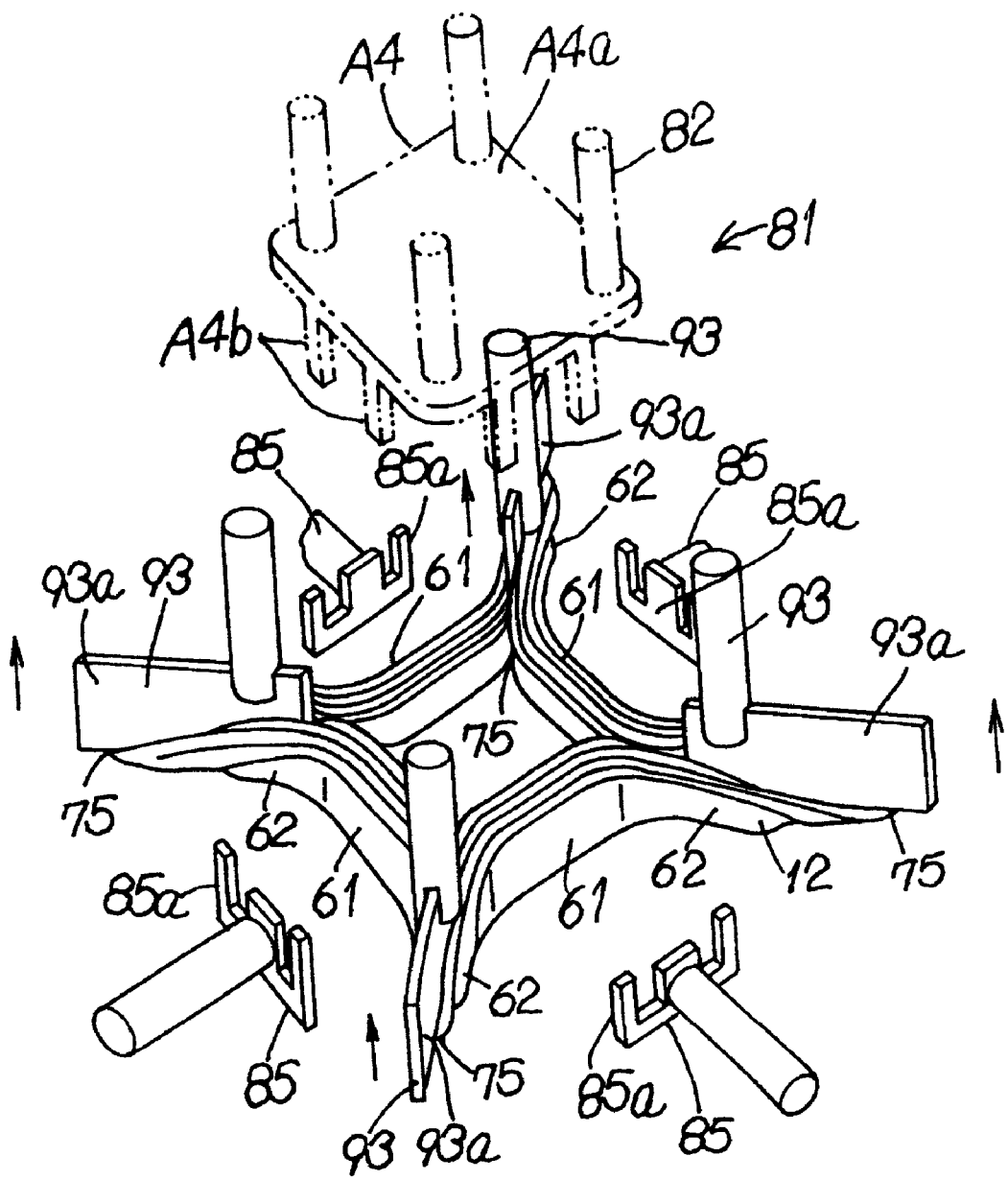
FIG. 27 is a schematic illustration to explain the procedure of folding the same.

The pushing jigs 85 are provided at four locations, i.e. one at each side, opposite the respective four sets of folding plates A1b through B4b and adapted to be capable of moving toward and away from the lower plug 88a that is in a shape resembling the inflator 16 and disposed at the center of the apparatus. The pushing jigs 85 include pushing plates 85a which stand on a lengthwise side and respectively extend along the four sides of the base plate 11. As shown in FIG. 27 and other drawings, each pushing plate 85a is in the shape of an E when viewed from the occupant's side, with cutout portions formed in order to prevent abutment against the corresponding upper folding plates from A1b to A4b.

As shown in FIG. 33, the winding jigs 86 are respectively positioned along the lines extended from the four sides of the base plate 11 and adapted to be driven back and forth along these extended lines.

With the configuration as above, the procedure of folding the air bag 12 starts with the initial position shown in FIGS. 21 and 22, wherein the upper and lower jigs 82,83 are vertically separated, and the pushing jigs 85 and winding jigs 86 are moved outward, away from one another. In this state, the air bag 12 attached to the base plate 11 is spread out in a circle and attached to the lower plug 88a, with the lower plug 88a inserted into the gas inlet opening 22 of the air bag 12, in other words into the inflator mounting hole 11a of the base plate 11. Then, by means of a pump which is not shown, the air in the air bag 12 is removed so as to reduce the volume of the air bag 12.

Figure 23:
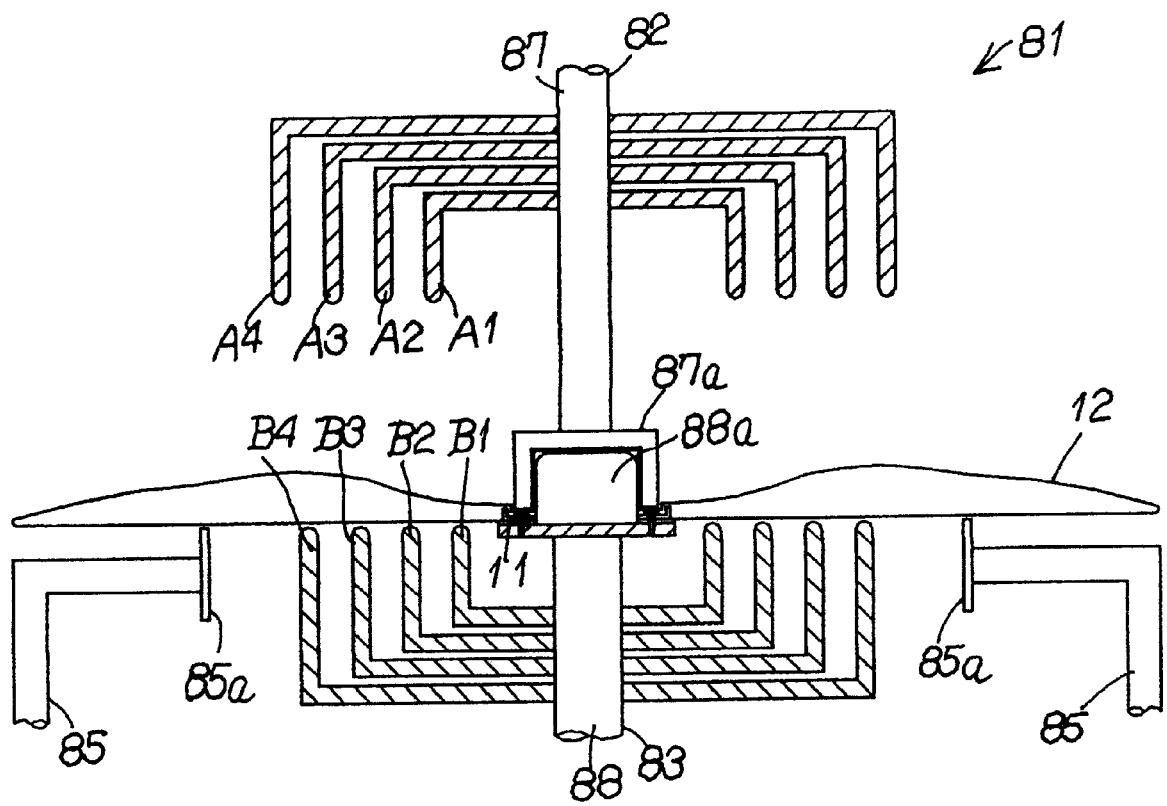
FIG. 23 is a schematic illustration to explain the procedure of folding the same.

Next, as shown in FIG. 23, the upper plug 87a of the upper jig 82 is lowered so that the occupant's side portion 23 of the upper fabric material 12a of the air bag 12 is held between the upper plug 87a and the lower plug 88a.

Thereafter, as shown in FIG. 24, the release line forming members 93 are lowered until the lower ends of the release line forming plates 93a face the upper surface of the air bag loading portion 91, at a minimal distance therefrom. In this state, the portion of the air bag 12 sandwiched between the release line forming plates 93a and the air bag loading portion 91 is held in a straight line while it is still able to move slightly.

Then, as shown in FIG. 25, the folding members A1 through B4 are moved closer to one another until they are alternately arranged. Of the spread air bag 12, the portion located outside the inflator 16 is folded perpendicularly to the bottom portion 21 in which the gas inlet opening 22 is formed, so that the surfaces of the fabric materials 12a,12b extend vertically along the outer face of the inflator 16 and bent at the upper and lower ends. Thus, the air bag is folded in the shape of waves that surround the gas inlet opening.

Figure 26:
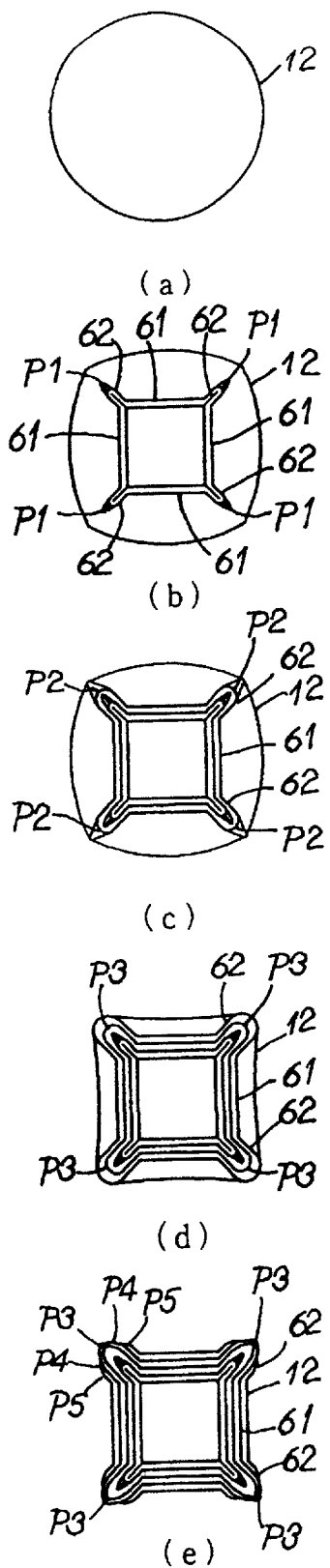
FIG. 26 is a schematic illustration to explain the procedure of folding the same.

At that time, by moving the folding members A1 through B4 from the innermost member, i. e. in the order of B1, A1, B2, A2, B3, A3, B4 and A4, the folding plates A1b through B4b successively come into contact with the fabric materials 12a,12b. During this process, as the crease of the first fold which constitutes the side portions 61 and the excess portions 62 is formed while a crease corner point P1 is simultaneously formed at the end of each excess portion 62, the air bag 12 spread out in a circle shown in FIG. 26(a) is formed into the shape shown in FIG. 26(b), wherein the crease is divided at four points. Then, as shown in FIG. 26(c), the air bag 12 is folded into a wave-like shape along the outer perimeter of the crease of the first fold so that the crease of the second fold is formed while a crease corner point P2 is formed at the end of each excess portion 62. Then, as the air bag 12 is folded again in the same manner, the crease of the third fold is formed while a crease corner point P3 is formed at the end of each excess portion 62 as shown in FIG. 26(d). Finally, by folding back the air bag 12 near the outer perimeter, creases p4,p5 are formed. Thus, four each side portions 61 and excess portions 62 are formed as shown in FIG. 26(e) and FIG. 27.

When the air bag is in the above state, each excess portion 62 is divided by a line extending through the crease corner points p1,p2,p3, i. e. a release line portion 75 that extends from the center of the bottom surface and communicates from the inner portion to the outer edge of the air bag 12. In other words, all the folds that constitute the side portions 61 and excess portions 62 are separated by said release line portion 75.

Figure 28:
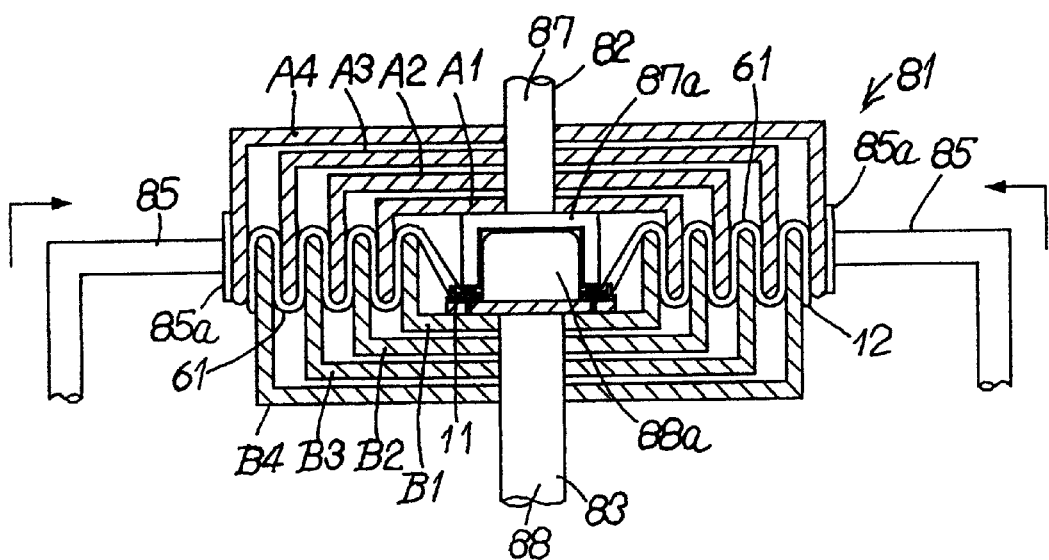
FIG. 28 is a schematic illustration to explain the procedure of folding the same.

Next, after the release line forming members 93 are elevated or otherwise retreated at need as shown with the arrows in FIG. 27, the pushing jigs 85 are moved upward and then inward as shown in FIG. 28. As a result, the pushing plates 85a of the pushing jigs 85 are combined with the folding plates A4b of the outermost folding member A4 and pressed against the outer faces of the respective side portions 61 of the air bag 12, thereby holding the shape of the air bag. In this state, the outermost upper and lower folding members A4,B4 are moved respectively upward and downward to the retreated positions.

Figure 29:
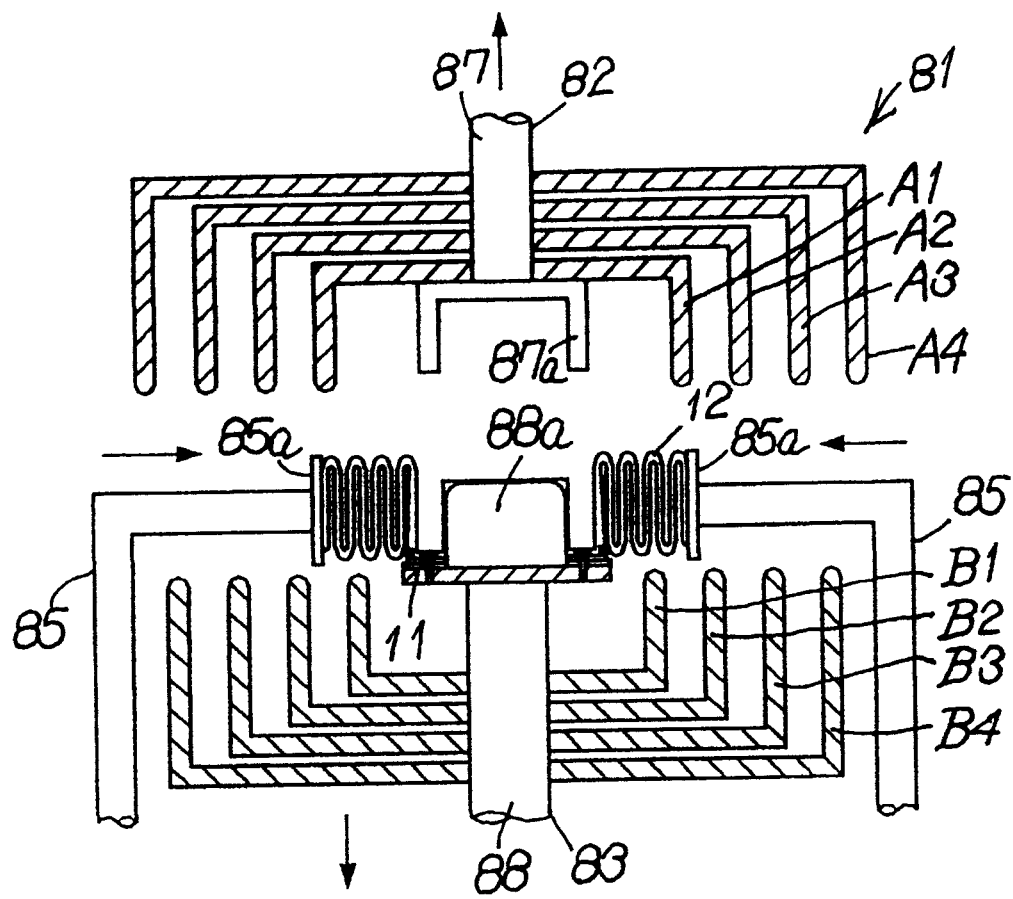
FIG. 29 is a schematic illustration to explain the procedure of folding the same.
Figure 30:
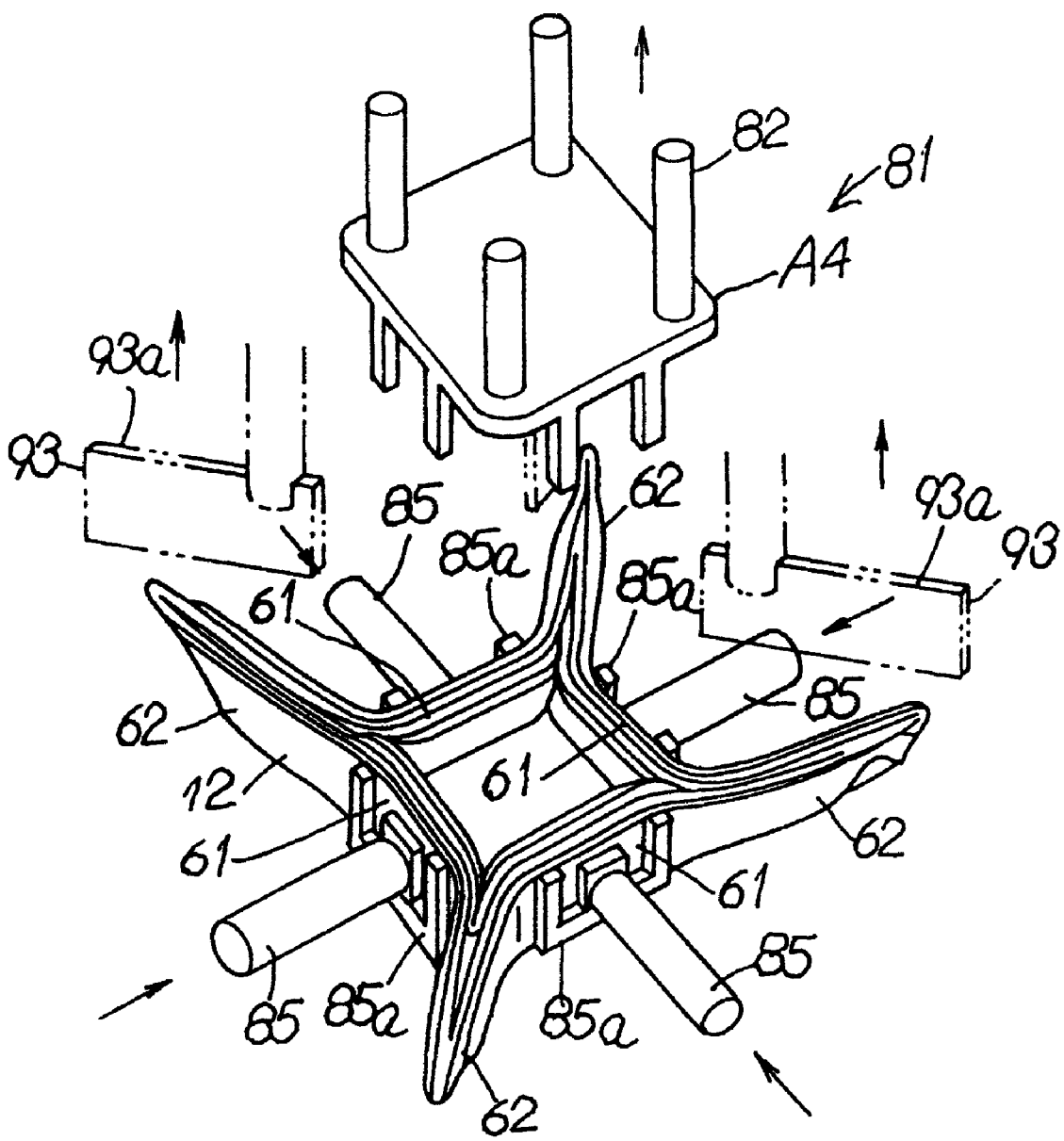
FIG. 30 is a schematic illustration to explain the procedure of folding the same.

Then, the pushing plates 85a of the pushing jigs 85 are pushed further inward until they are combined with the folding plates A3b of the folding member A3, and the upper and lower folding members A3,B3 now located at the outermost position, are vertically moved to retreat while the pushing plates 85a are pressed against the air bag 12. While the pushing jigs 85 are advanced by repeating the above steps, the remaining upper and lower folding members A2,B2,A1,B1 and the upper plug 87a are removed as shown in FIGS. 29 and 30.

Figure 31:
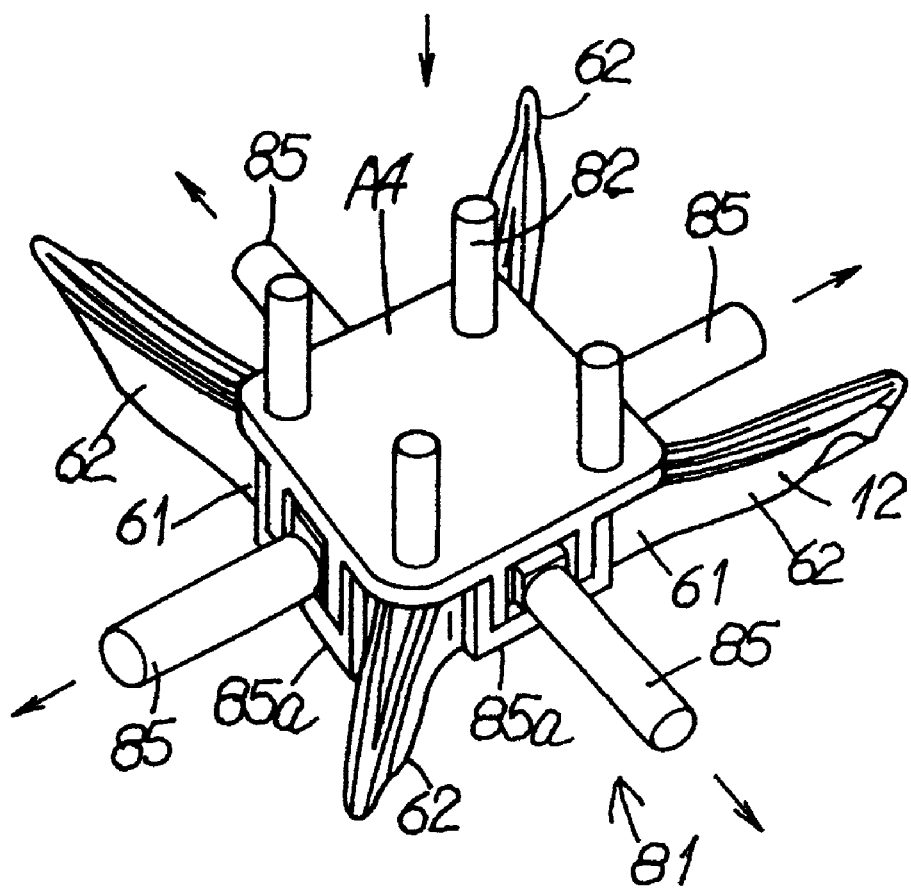
FIG. 31 is a schematic illustration to explain the procedure of folding the same.

Next, as shown in FIG. 31, the upper folding members A1 through A4 are lowered again, and the pushing jigs 85 are moved backwards outward while the shape of the folded air bag 12 is maintained by the folding plates A1b through A4b of the folding members A1 through A4 that hold the outer surfaces of the side portions 61 of the air bag.

Figure 18:
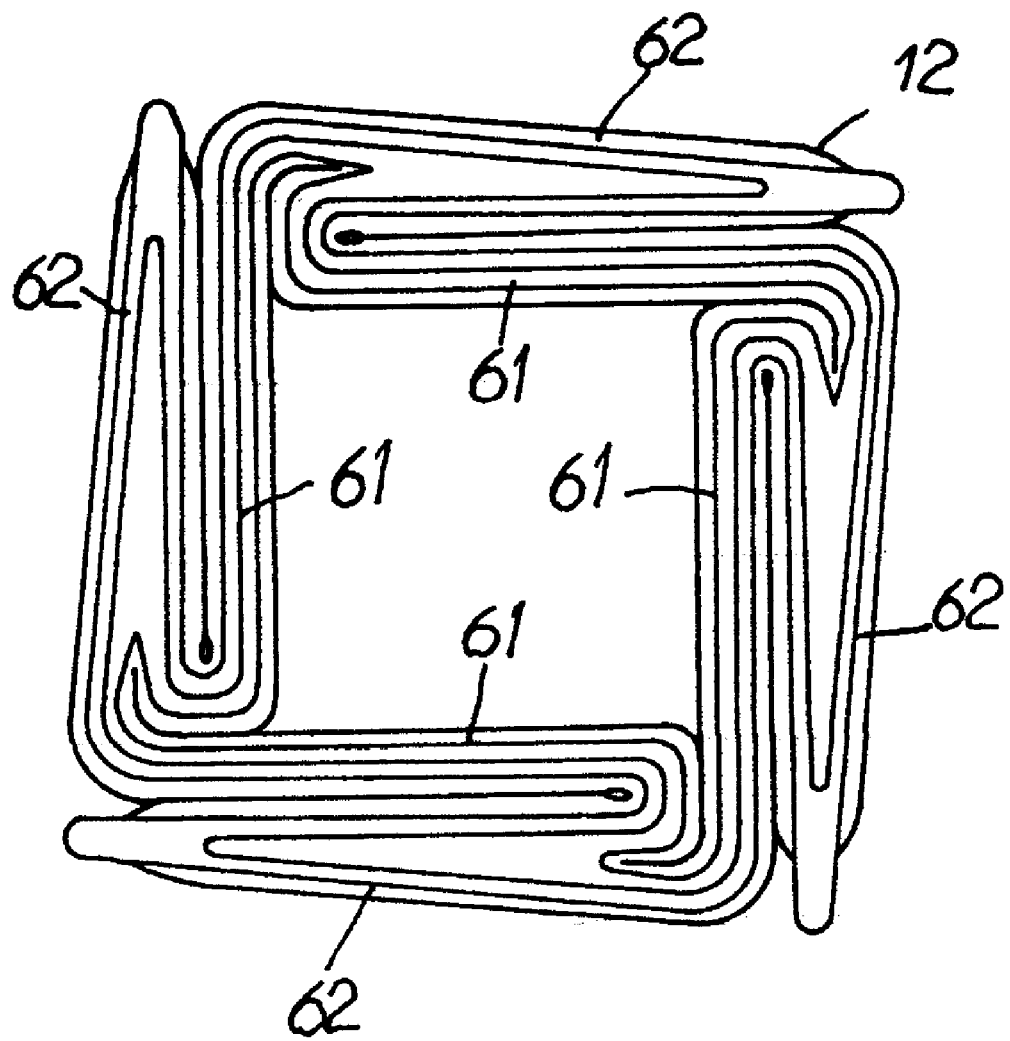
FIG. 18 is a top view of an air bag folded according to a ninth embodiment of the invention.
Figure 32:
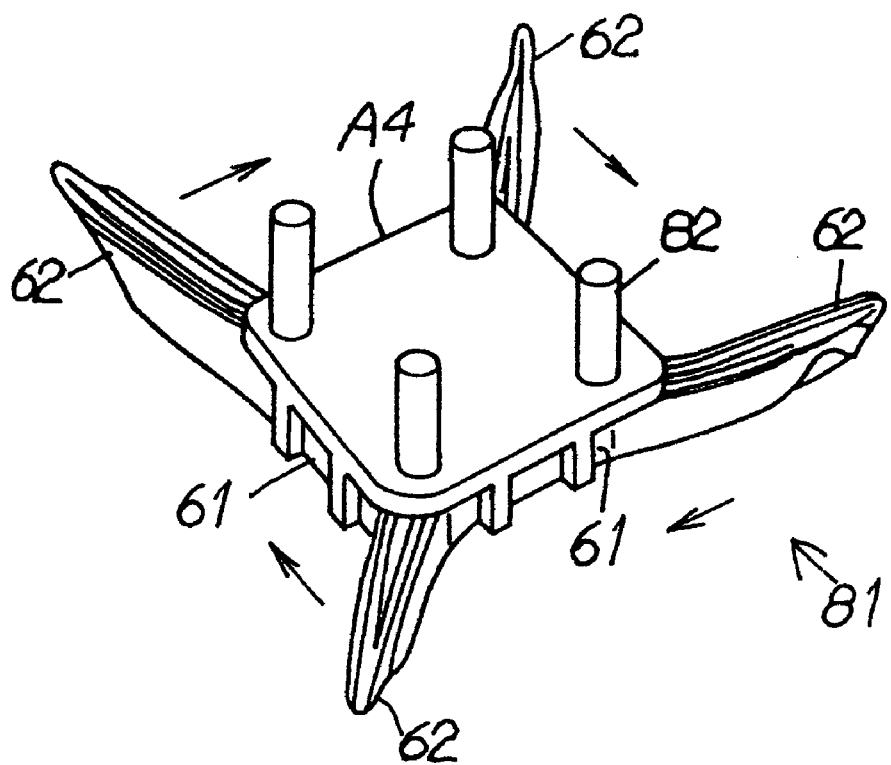
FIG. 32 is a schematic illustration to explain the procedure of folding the same.

In this state, the winding jigs 86 are advanced to wind the excess portions 62, which protrude in four directions from the corners, respectively around the adjacent side portions 61 as shown in FIGS. 32 and 33 so that the outline of the air bag becomes rectangular when viewed from the top. Then, by elevating the folding members A1 through A4 that have been lowered as above and retracting the winding jigs 86, the air bag 12 is folded in an orderly fashion into a specified shape such as the one that fits to the shape defined by the mounting wall portions 27 of the cover 14. In case of this embodiment, the air bag is folded in a shape having a rectangular outline as shown in FIG. 18.

While having the same effects as those of the other embodiments described above, the ninth embodiment, wherein a release line portion 75 that communicates from the inner portion to the outer edge of the air bag 12 is formed, is capable of directing the gas injected into the air bag smoothly to the occupant's side portion 23 of the air bag 12, thereby allowing the air bag 12 to tear the cover 14 and smoothly project therefrom. In addition, after the air bag 12 has projected out of the cover 14, the gas injected toward the center of the air bag 12 can be smoothly fed toward the outer perimeter so that the air bag may be smoothly inflated outward.

Although the creases that constitute the side portions 61 and the excess portions 62 are formed successively in the order from the innermost crease to the outermost crease according to the ninth embodiment, the creases may be formed simultaneously or in the order according to any other appropriate criteria by manual operation or by means of a folding apparatus. Further, a release line portion 75 described above may be applicable to an air bag 12 according to any other embodiment of the invention.

Figure 34:
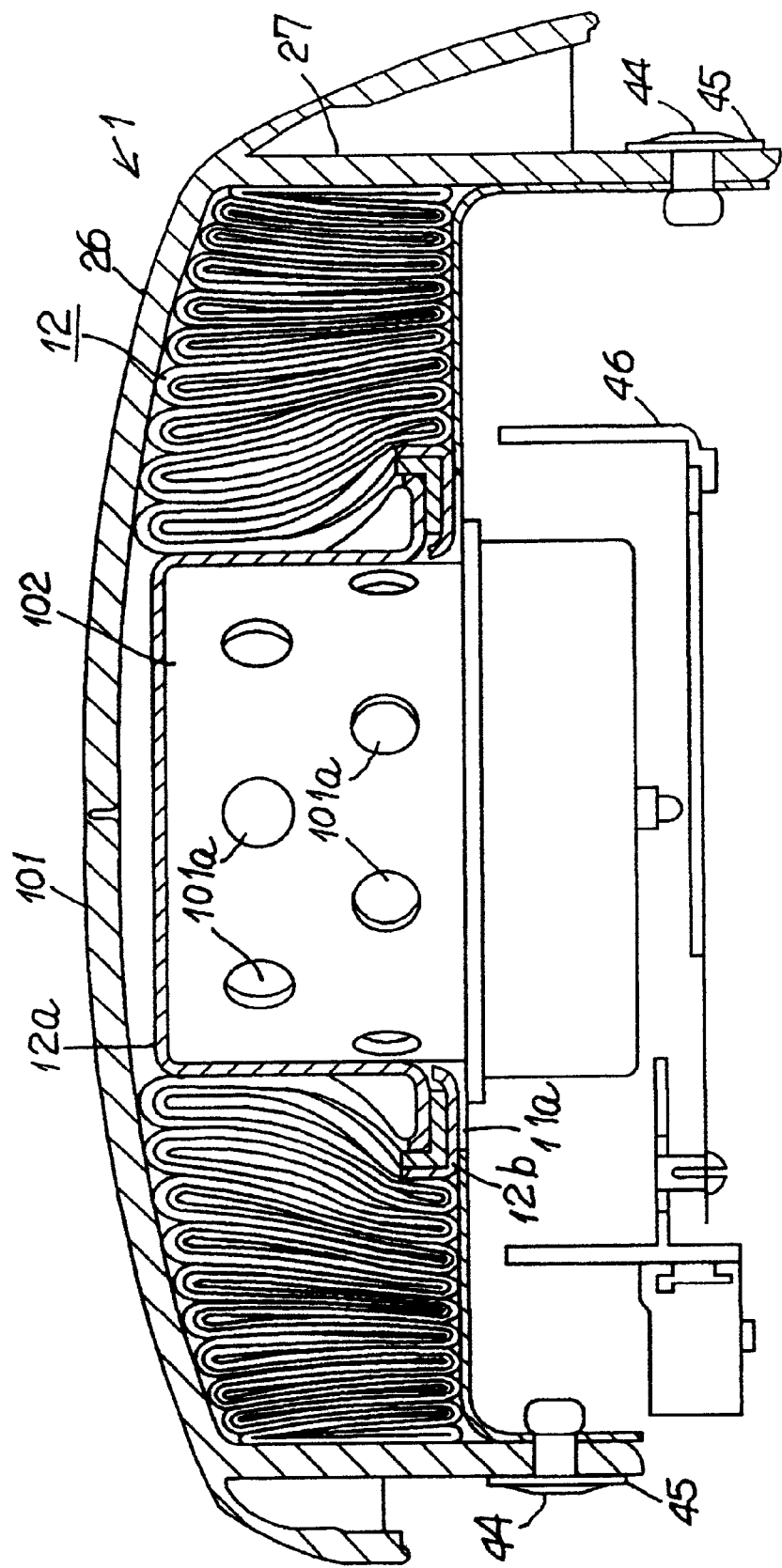
FIG. 34 is a sectional view of an air bag system according to a tenth embodiment of the invention.

Although a space adapted to house a horn switch mechanism 31 is secured above the inflator 16 according to some of the embodiments including the second embodiment, other configurations may also be applicable. For example, as in a tenth embodiment shown in FIG. 34, the horizontal size of an air bag system 1 may be reduced by using an inflator 102 with a smaller diameter while increasing the height of the air bag system 1 by using a cover 101 which is not provided with a recess and arranging gas ejection holes 101a in two rows.

In any one of the embodiments described above, a folding operation of the air bag 12 may be fully automated by using various folding apparatuses, or done by fully manual operation or a combination of manual operation and a folding apparatus.

Although the embodiments explained as above have a configuration which is typically shown in FIG. 2, wherein the side portions of the air bag are folded into wave-like folds that consist of precise repetition of a specified shape by means of jigs disposed above and below the air bag, the invention is not limited to such a configuration; irregularity and unevenness to a certain extent is permissible when folding the air bag into a wave-like pattern. It is assumed that the movement of the air bag during its inflation can be more easily set by precisely positioning each crease of the air bag at a specified location. In case of an air bag made of fabric, however, it is difficult to position the creases precisely at specified locations in the first place. Also, even if the air bag were folded into somewhat irregular, uneven waves, the movement of the air bag can be controlled sufficiently. In this regard, other configurations such as the one which calls for spreading an air bag flatly and pushing the same inward from the outer perimeter while limiting the vertical clearance are also capable of easily folding the air bag compactly and allowing it to smoothly expand forward while restricting irregular wrinkles in a radial direction.

Other than mounted on the steering wheel of a vehicle, an air bag system 1 according to the invention may be used as an assist air bag system disposed in the instrument panel in front of the passenger seat, a side air bag system disposed at a side of a seat or in a door panel, or a rear seat air bag system mounted on the back of a front seat. Furthermore, in addition to a vehicle, the invention is also applicable to any moving body or the like which requires protection from a shock.

Figure 35:
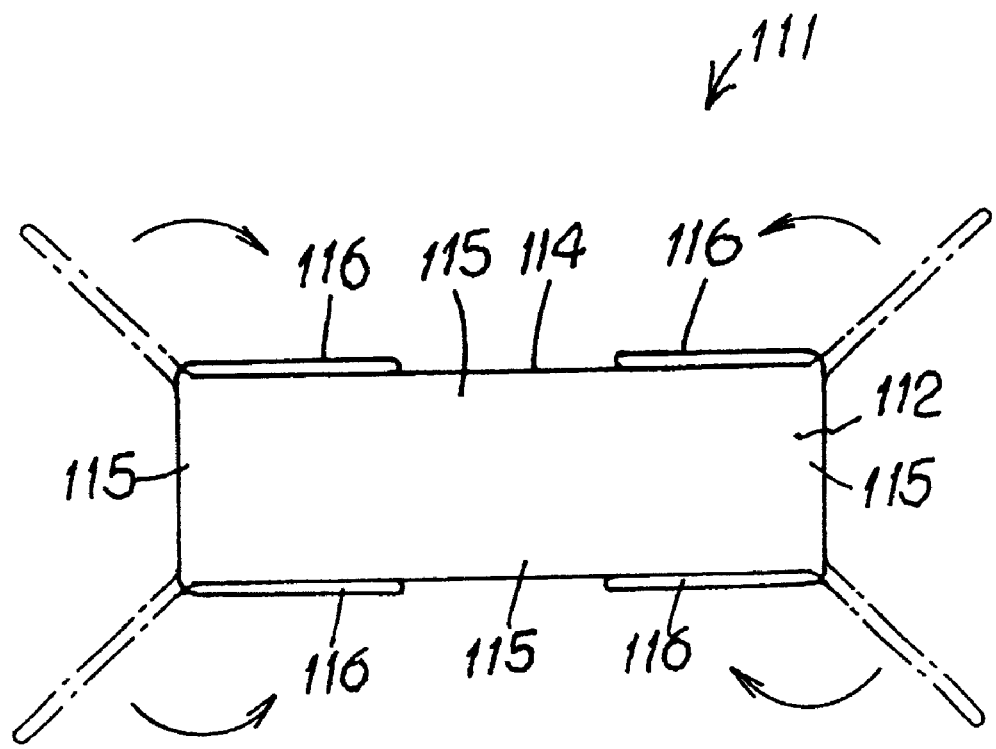
FIG. 35 is a schematic illustration to explain the procedure of a folding operation of an air bag system according to an eleventh embodiment of the invention.

For example, as in an eleventh embodiment shown in FIG. 35 which relates to an air bag system 111 for a passenger seat, an air bag 112 which is so formed as to be in a rectangular shape as viewed from the occupant's side when it is inflated may be housed in a case 114 having an opening in a rectangular shape as viewed from the occupant's side by following the procedure such as pushing the spread air bag 12 inward from the outer perimeter so as to form side portions 115, which are formed by folding the air bag into a wave-like pattern at four locations, and four excess portions 116, each of which protrudes outward in the radial direction from a corner between two adjacent side portions, and placing the excess portions 116 along the outer faces of the two longer side portions 115. Thus, through a simple operation, the air bag 12 can be folded into such a shape as to be contained in a case 114.

Next, a twelfth embodiment of the invention is explained hereunder referring to FIGS. 36 to 48.

Figure 37:
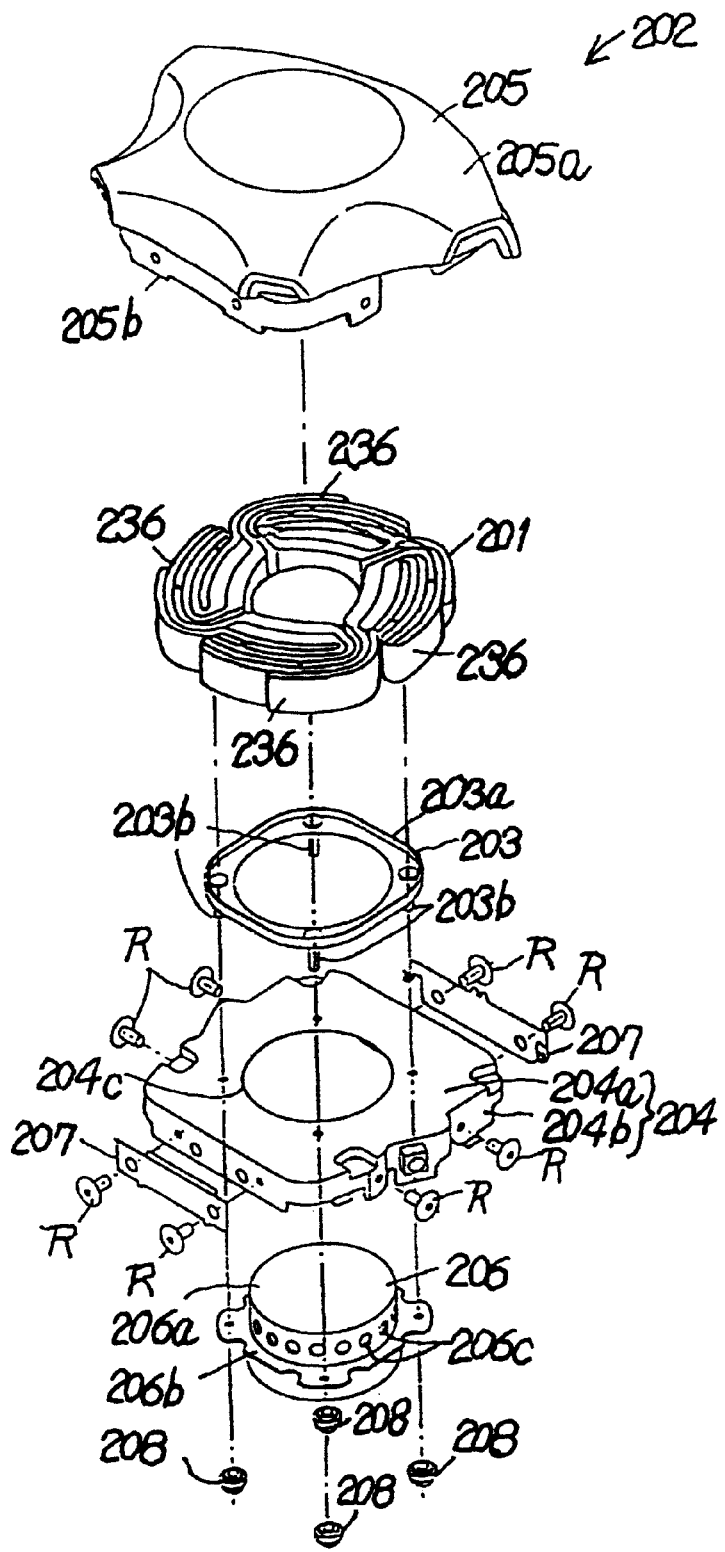
FIG. 37 is an exploded perspective view of an air bag system including said air bag.

In the same manner as the embodiment shown in FIG. 1, an air bag 201 according to the present embodiment as shown in FIG. 37 is adapted to be incorporated in an air bag system 202 to be mounted on the boss portion of the steering wheel of a vehicle. In addition to the air bag 201, the present air bag system 202 includes a generally annular retainer 203, a base plate 204 to be attached to the steering wheel, a tearable cover 205 which may be made of synthetic resin, and an inflator 206 adapted to eject gas. In the explanation hereunder, the axial direction in which the air bag 201 projects, in other words, the side of the person to be protected by the air bag, is referred to as the upper side (the occupant's side) and the side facing the body of the vehicle (the steering shaft) is referred to as the lower side.

The air bag 201 is formed by sewing together nearly identical two circular fabric materials, i. e. the upper and lower fabric materials, into a flat bag. A gas inlet opening in the shape of a circular hole is formed at the approximate center of the lower fabric material, and bolt insertion holes are formed around the gas inlet opening, one each at four locations. These fabrics are made of a material having a specified strength, flexibility (superior resilience), airtightness and heat resistance, such as nylon cloth coated with rubber or the like. Although what is generally called non-coated nylon (nylon that is not coated) of 420 deniers with 53 counts and a thickness of 0.30 mm is used in the present embodiment, any other suitable materials, e. g. a fabric produced by coating a nylon fabric of 420 deniers with 46 counts and a thickness of 0.30 mm with silicone rubber.

The retainer 203 is comprised of a generally ring-shaped retainer body 203a and four mounting bolts 203b extending downward from the retainer body 203a. The base plate 204 includes a base plate portion 204a in the shape of a generally rectangular flat plate and side plate portions 204b extending from the edges of the base plate portion 204a as if formed by bending the edges of the base plate portion 204a downward. An inflator mounting hole 204c is bored through the base plate portion 204a. The cover 205 includes a cover portion 205a adapted to cover the boss portion and a part of the spoke portion of the steering wheel, and a mounting plate portion 205b in the shape of a generally square tube. Said cover portion 205a and the mounting plate portion 205b are formed as an integral body, and the space defined by these cover portion 205a and the mounting plate portion 205b serves as a storage portion to contain the folded air bag 201. The inflator 206 comprises a generally cylindrical main body 206a and a flange portion 206b which is formed around the outer wall of the main body 206a, and gas ejection holes 206c for ejecting gas are formed around the outer wall of the main body 206a.

With the configuration as above, the air bag 201 is folded into a specified shape, which is described later, in the state the retainer 203 has been inserted into the air bag beforehand with the mounting bolts 203b protruding outward through the bolt insertion holes. The air bag 201 is then inserted into the storage portion of the cover 205 from underneath to be stored therein. Thereafter, the base plate 204 is fitted to the storage portion of the cover 205 from underneath, and the mounting plate portion 205b is fastened to the side plate portions 204b by means of reinforcing plates 207 and rivets R. Then, the main body 206a of the inflator 206 is inserted from underneath the base plate 204 through the inflator mounting hole 204c into the gas inlet opening of the air bag 201, and, by tightly screwing nuts 208 around the tips of the mounting bolts 203b, the air bag system 202 is assembled, with the portion of the air bag 201 around the gas inlet opening, the base plate portion 204a of the base plate 204 and the flange portion 206b of the inflator 206 sandwiched between the retainer 203 and the nuts 208.

In such an event as collision of the vehicle equipped with the air bag system, gas is ejected from the inflator 206, thereby unfolding and expanding the folded air bag 201. The pressure of the expansion tears the cover 205 along a tear line formed under specified conditions, thereby forming a breakthrough opening for the air bag 201. In that state, the air bag 12 projects from this opening toward the occupant and continues to be unfolded and inflated at the same time into a specified shape so as to protect the person at the seat equipped with the air bag system from the shock of the collision.

Figure 38:
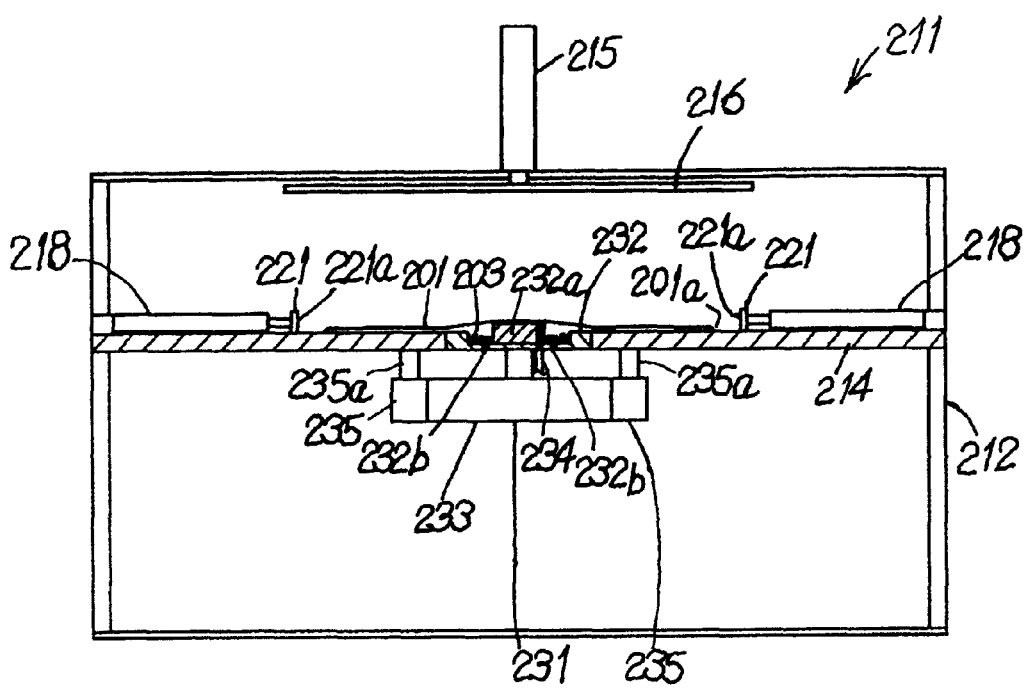
FIG. 38 is a general view of said folding apparatus.
Figure 39:
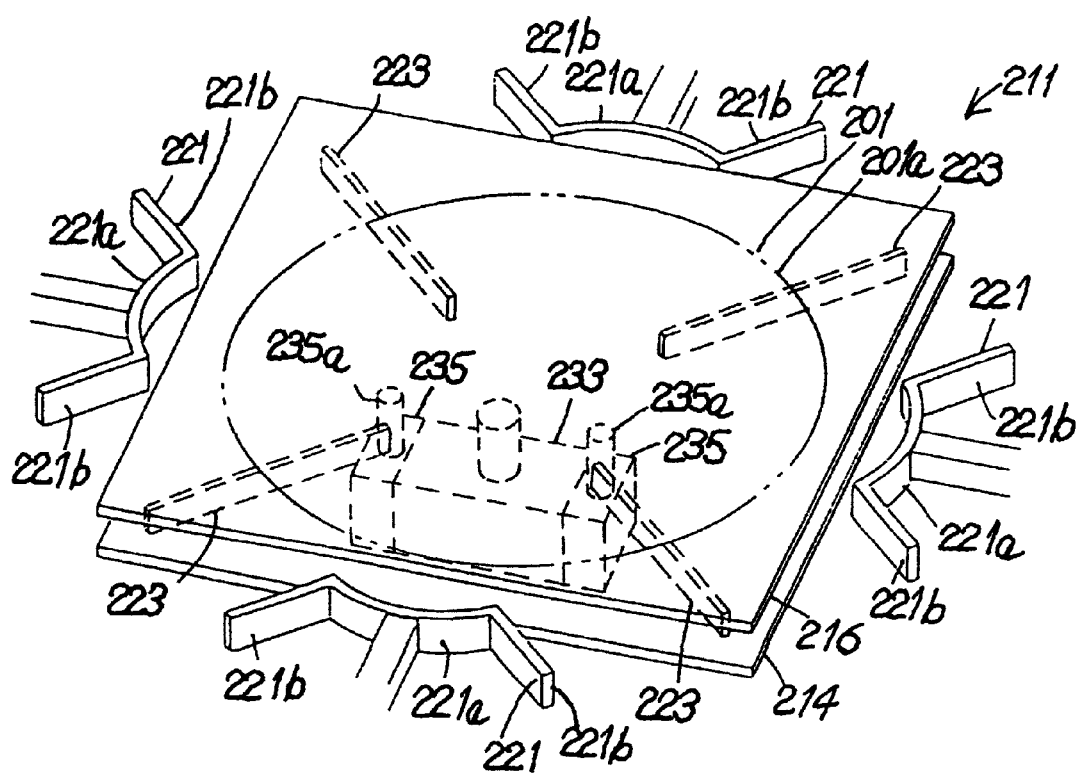
FIG. 39 is a perspective view of a part of said folding apparatus.

Next, a folding apparatus 211 for folding the air bag 201 is explained referring to FIGS. 38 and 39. It is to be noted that the entire folding apparatus 211 is controlled by a control means such as a computer, which is not shown in the drawings.

The folding apparatus 211 includes a rack 212, to which a horizontal lower plate 214 serving as a loading portion and an upper cylinder 215 serving as a driving means are fixed. The upper cylinder 215 is located above the center of the lower plate 214 and adapted to be operated by air pressure or the like to support a horizontal upper plate 216, which serves as a height restricting means, in such a manner that the upper plate 216 is capable of moving up and down.

Four pressure cylinders 218 serving as a driving means are radially arranged and fastened to the rack 212 or the lower plate 214. These pressure cylinders 218 are adapted to be driven by air pressure or the like and respectively support pushing members 221 which are adapted to move toward and away from the center of the lower plate 214 so as to serve as a pushing means (an outer edge pushing means). Each pushing member 221 is a plate positioned perpendicularly to the horizontal plane of the lower plate 214 and comprises a center portion 221a and lug forming portions 221b respectively extending from both ends of the center portion 221a. The center portion 221a is formed in an arc with a central angle of nearly 45°, which is similar to the outline of the air bag 201 in the completely folded state. Each lug forming portion 221b extends diagonally rearward at an angle of, for example, about 45° with respect to the associated pushing cylinder 218 so that the entire pushing member 221 looks as if spreading rearward.

Figure 42:
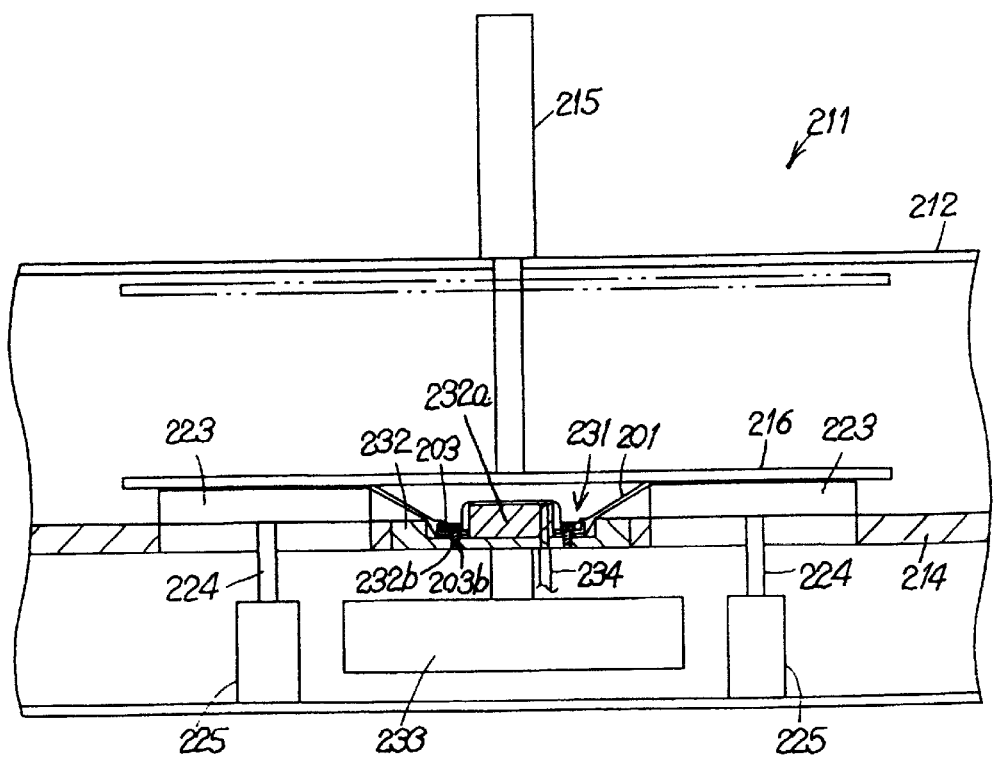
FIG. 42 is a sectional view taken along the line II—II in FIG. 36 to illustrate the same.

Lug forming plates 223 serving as a radial position restricting means are radially arranged in such a manner that each lug forming plate 223 is disposed between each two adjacent pushing members 221. Each lug forming plate 223 is in the shape of a generally rectangular plate which stands on its side like a rib and is connected through a connecting shaft 224 to a lower cylinder 225 as shown in FIG. 42, and adapted to be moved vertically (or radially) by said connecting shaft 224 so as to project above and retract below the upper surface of the lower plate 214.

An air bag attaching portion 231 that constitutes a winding means is provided at the center of the lower plate 214. The air bag attaching portion 231 includes a retainer fixing portion 232 and a rotary actuator 233 which is joined to the retainer fixing portion 232. The retainer fixing portion 232 includes a folding mold body 232a in a shape that resembles the inflator 206 and bolt supporting holes 232b adapted to permit the mounting bolts 203b of the retainer 203 to be respectively inserted therein. The rotary actuator 233 is adapted to be driven by air pressure or the like to rotate the retainer fixing portion 232 with respect to the lower plate 214. If it is necessary, a suction port connected to a suction unit 234 comprised of a vacuum pump or the like may be formed in the upper surface of the folding mold body 232a as shown in FIG. 38, etc., so that the air in the air bag 201 may be evacuated.

The air bag attaching portion 231 is connected to and supported by a pair of oppositely arranged pushing cylinders 235, which serve as a driving means that constitutes an insertion means. Each pushing cylinder 235 has a driving shaft 235a affixed to the underside of the lower plate 214 so that the air bag attaching portion 231 may be moved above the lower plate 214 by advancing these driving shafts 235a.

Next, a folding operation (a folding method) using the above folding apparatus is explained hereunder.

Figure 40:
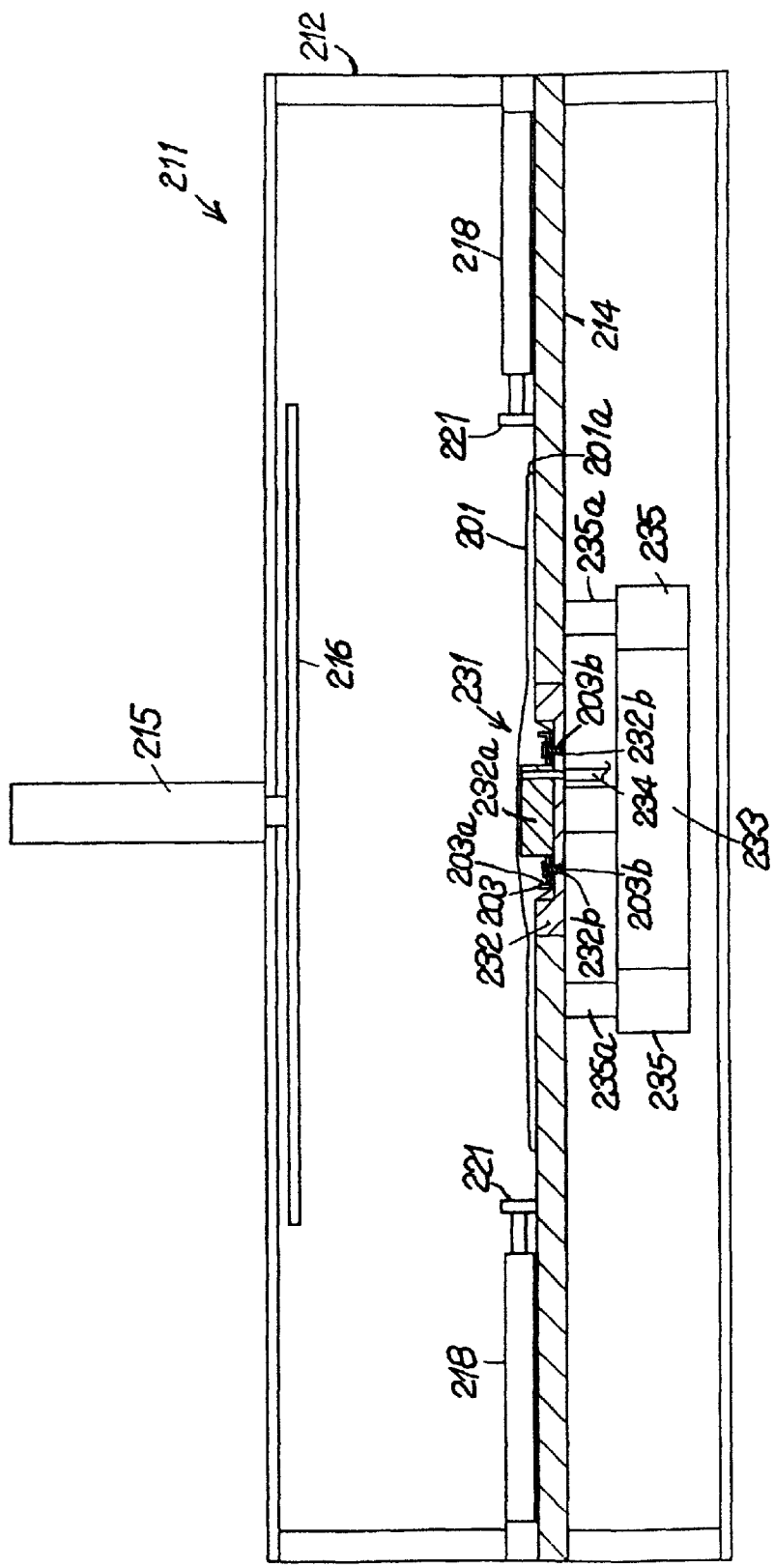
FIG. 40 is a sectional view taken along the line I—I in FIG. 36 to illustrate the operation procedure using said folding apparatus.

First of all, as shown in FIG. 40, the upper plate 216 is moved upward, and the pushing members 221 and the lug forming plates 223 are then respectively retracted outward and downward. In this state, the air bag 201 is flatly spread over the lower plate 214 in such a manner that the upper and the lower fabric materials nearly precisely overlap each other. As an alternative step, the air bag 201 may be flatly spread over the lower plate 214 in the state where the lug forming plates 223 are advanced upward. At that time, the retainer 203 is inserted beforehand into the air bag 201 so that the mounting bolts 203 project downward through the bolt insertion holes. Then, the retainer 203 is fitted in the retainer fixing portion 232 of the air bag attaching portion 231, and the air bag 201 is positioned by inserting the mounting bolts 203b into the bolt supporting holes 232b and inserting the folding mold body 232a into the gas inlet opening.

Figure 41:
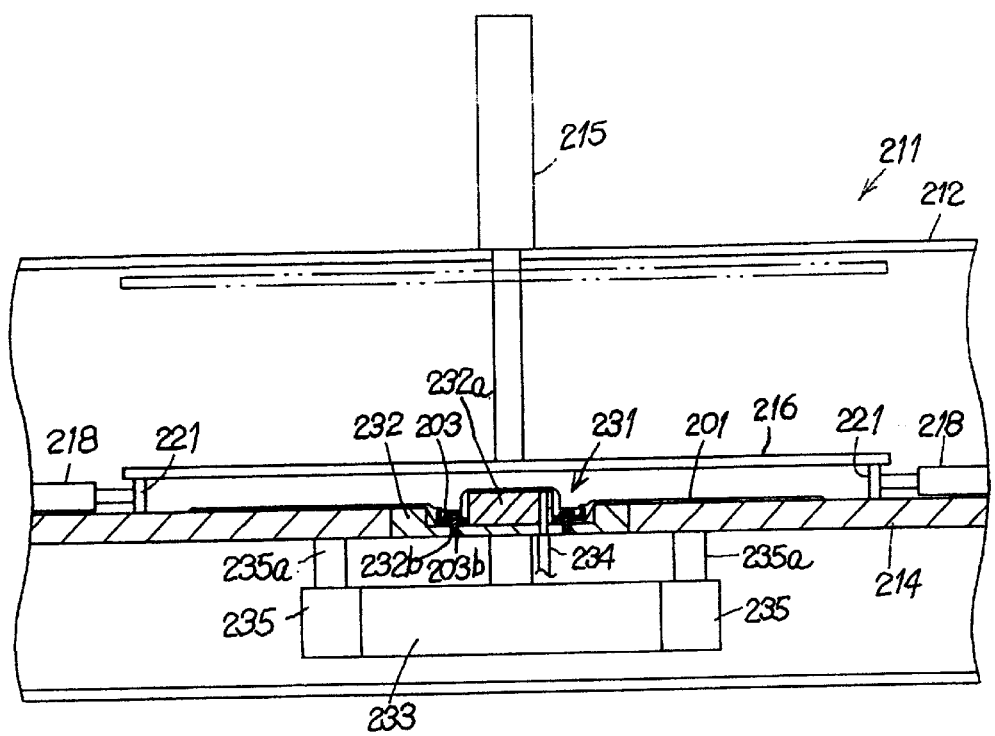
FIG. 41 is a sectional view taken along the line I—I in FIG. 36 to illustrate said folding procedure, showing the step subsequent to that shown in FIG. 40.

Thereafter, as shown in FIG. 41, the suction unit 234 may be actuated at need to suck the air in the air bag 201 so that the upper and the lower fabric materials are brought into close contact with each other. Then, while the upper plate 216 is advanced downward in order to limit the height of the air bag 201 when folded, the lug forming plates 223 are advanced upward to lift the air bag 201 in the manner shown in FIG. 42, where the air bag 201 is supported radially at four locations and slidably pressed against the underside of the upper plate 216. In that state, the distance between the upper plate 216 and the lower plate 214 ranges from 30 mm to 50 mm, which corresponds to the height of the final folded shape of the air bag 201.

Figure 36:
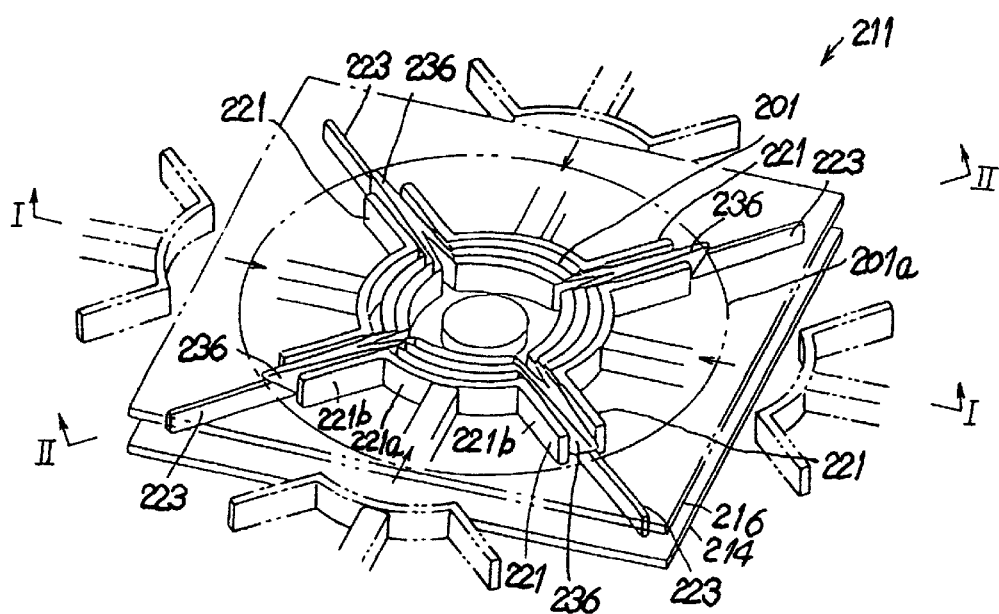
FIG. 36 is a schematic illustration to explain a method and an apparatus for folding an air bag according to a twelfth embodiment of the invention.

Then, as shown in FIG. 36, the pushing members 221 are simultaneously advanced toward the center of the apparatus to push the air bag 201, starting at its outer end toward the final folded shape. The height of the air bag 201 is limited by the upper plate 216. In addition, the air bag 201 is made of a fabric having a given resilience. Therefore, the pushed portion is folded into a wave-like pattern wherein creases extend along the perimeter of the folding mold body 232a, the creases being in the shape of coaxially arranged arcs or straight lines. In this state, the portions respectively held by the lug forming plates 223 remain unfolded and form lug portions 236, each of which projects outward having a crease radially extending from the center toward the outer perimeter 201a. As each lug forming plate 223 and a lug portion 236 are tightly sandwiched between the lug forming portions 221b of each two adjacent pushing members 221, the lug portions 236 are ensured to be formed in a specified shape.

Figure 43:
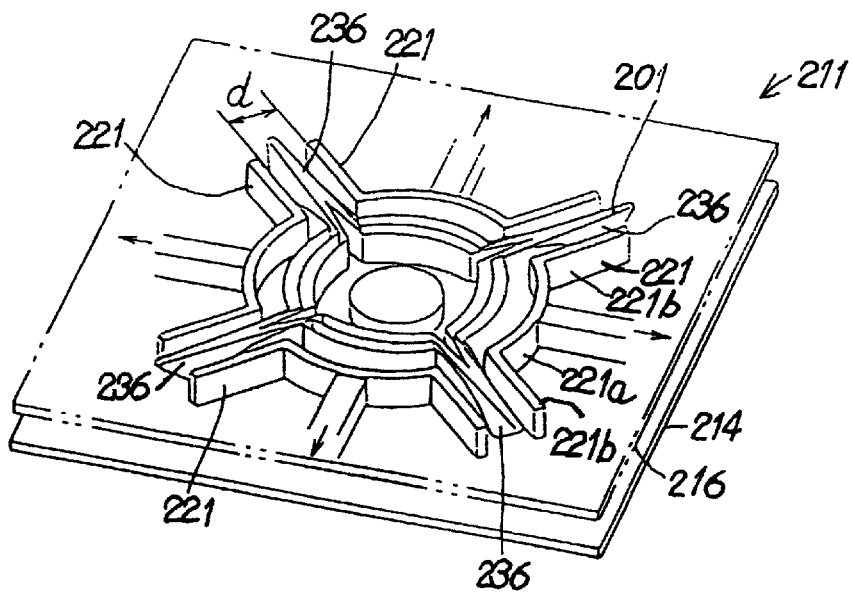
FIG. 43 is a perspective view of the same, showing the step subsequent to that shown in FIG. 42.

Thereafter, as shown in FIG. 43, the pushing members 221 are simultaneously retracted outward by a short distance to increase the distance d between the lug forming portions 221b of each two adjacent pushing members 221, thereby enabling the lug portions 236 to slide along the lug forming portions 221b and the lug forming plates 223. Thereafter, the lug forming plates 223 are moved downward.

Figure 44:
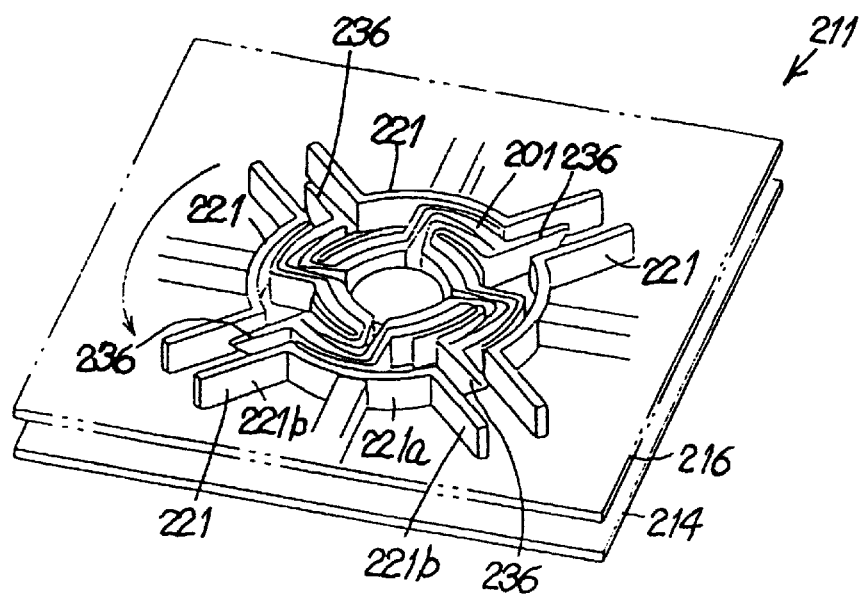
FIG. 44 is a perspective view of the same, showing the step subsequent to that shown in FIG. 43.

In this state, the rotary actuator 233 is operated to rotate the retainer fixing portion 232 of the air bag attaching portion 231 in a given direction at a given speed as shown in FIG. 44, thereby rotating the central portion of the air bag 201 contained in the retainer fixing portion 232, so that the lug portions 236 are turned inward until they are wound around the outer surface of the portion of the air bag which is folded into a wave-like pattern.

Figure 45:
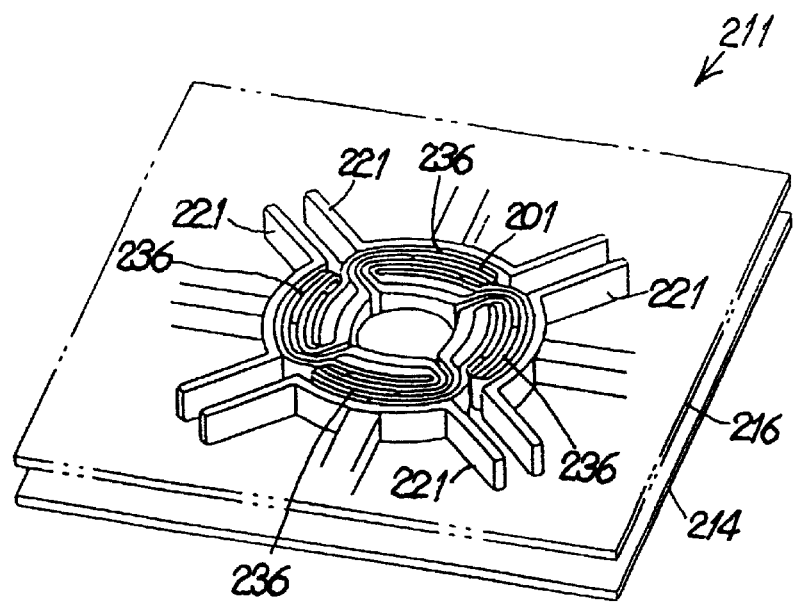
FIG. 45 is a perspective view of the same, showing the step subsequent to that shown in FIG. 44.

Then, if it is necessary, the pushing members 221 may be simultaneously advanced inward by a short distance to arrange the shape of the air bag into the final folded shape after the lug portions 236 are completely wound inward as shown in FIG. 45,. As an alternative step in case of need, the lug forming plates 223 may be returned to the state shown in FIG. 42 and then simultaneously advanced inward by a short distance to arrange the shape of the air bag if it is necessary to form it into the final folded shape. In order to enable the air bag 201 to be smoothly inserted into the cover 205, the process of which is explained hereunder, the air bag 201 has to be folded into a shape whose horizontal area is smaller than that of the storage portion of the cover 205.

Figure 46:
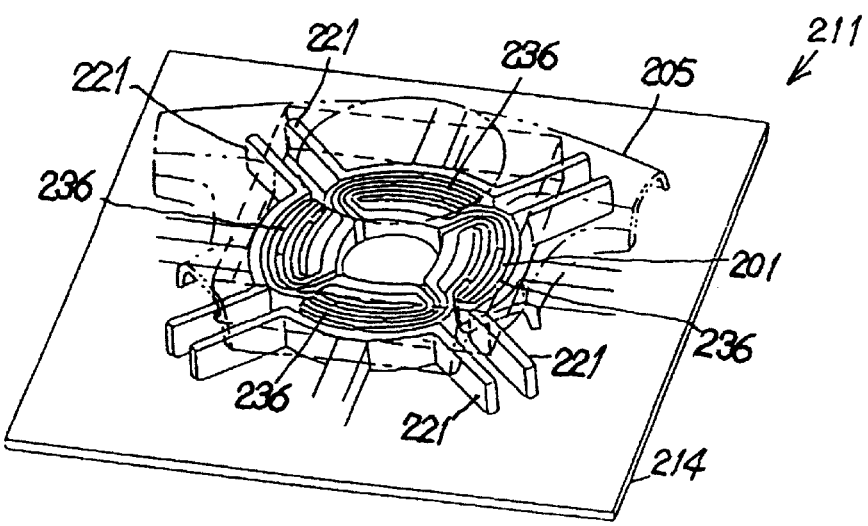
FIG. 46 is a perspective view of the same, showing the step subsequent to that shown in FIG. 45.

Next, after the upper plate 216 is retracted upward, the cover 205 is positioned at a given location above the folded air bag 201 as shown in FIG. 46. Then, while the operator holds the cover 205 so as to prevent it from moving upward, the pushing cylinders 235 at both sides of the cover are operated to raise the air bag attaching portion 231 to a position shown in FIGS. 47 and 48, at a given distance from the lower plate 214, and the completely folded air bag 201 is inserted into the storage portion of the cover 205. Thus, the process of folding the air bag 201 and installing the folded air bag in the cover 205 is completed.

According to the embodiment of the invention described above, by pushing the spread out air bag 201 from four directions toward the center by means of the pushing members 221 in the state where the height of the air bag 201 is limited by the upper plate 216 that functions as the height restricting means, the air bag 201 can be folded in such a manner that wave-like folds are formed along the four sides of the central portion of the air bag with the lug portions 236 radially projecting from between the folded portions. Then, by placing the lugs 236 along the outer face of the folded portions by manual operation or by using an apparatus, the air bag is formed into the final folded shape that can be easily inserted into the cover 205. According to the process described above, a folding operation can be executed through simple movement of the cylinder without the need of an apparatus which has a complicated structure including members adapted to engage with one another or calls for a complicated operation in order to fold the air bag 201 into a wave-like pattern. Therefore, said process is capable of simplifying the structure of a folding apparatus 211, reducing its size and production costs as well as the time required for the folding operation. Consequently, the process reduces costs for folding an air bag 201 as well as production costs for an air bag system 202 itself.

As a lug forming plate 223 is provided between each two adjacent pushing members 221, lug portions 236 which radially project outward from the central portion can be easily and reliably formed when the pushing members 221 are advanced to fold the air bag 201.

Further, as an air bag attaching portion 231 for rotating the central portion of the air bag 201 is provided as a winding means, the air bag 201 can be easily folded into the final folded shape by winding the lug portions 236 around the outer surface of the folded portions.

Furthermore, as the process according to the invention allows the folded air bag 201 to be inserted into the storage portion of the cover 205 directly from the folded state, the process does not require a special structure for holding the folded air bag in shape and therefore enables the folding operation to be completed quickly and simplifies the production of an air bag system 202.

According to the process described above, the air bag 201 is folded along the perimeter of the central portion where the gas inlet opening is formed. Therefore, when gas is fed from the inflator 206 into the central portion, the air bag can be unfolded and inflated smoothly and rapidly from the central portion toward the occupant's side. Thus, the process is capable of reducing the pressure of the gas when it tears the cover 205, and unfolding and expanding the air bag 201 smoothly and rapidly with effective use of the gas. In addition, as the process is capable of reducing the load applied to the attaching portion at which the air bag 201 is supported, it enables the simplification of the structure of the attaching portion.

In the process for folding the air bag 201 shown in FIGS. 36 and 43 according to the twelfth embodiment described above, the pushing members 221 are advanced once so that the final folded shape may be formed, and then moved backward in order to enable the winding of the lug portions 236. Depending on resilience and other characteristics of the fabric of the air bag 201, however, the step shown in FIG. 43 where the pushing members 221 are moved backward may be omitted by setting the moving range of each pushing member 221 closer to the outer end than is shown in FIG. 36 when it advances and enabling the lug portions 236 to slide.

Figure 47:
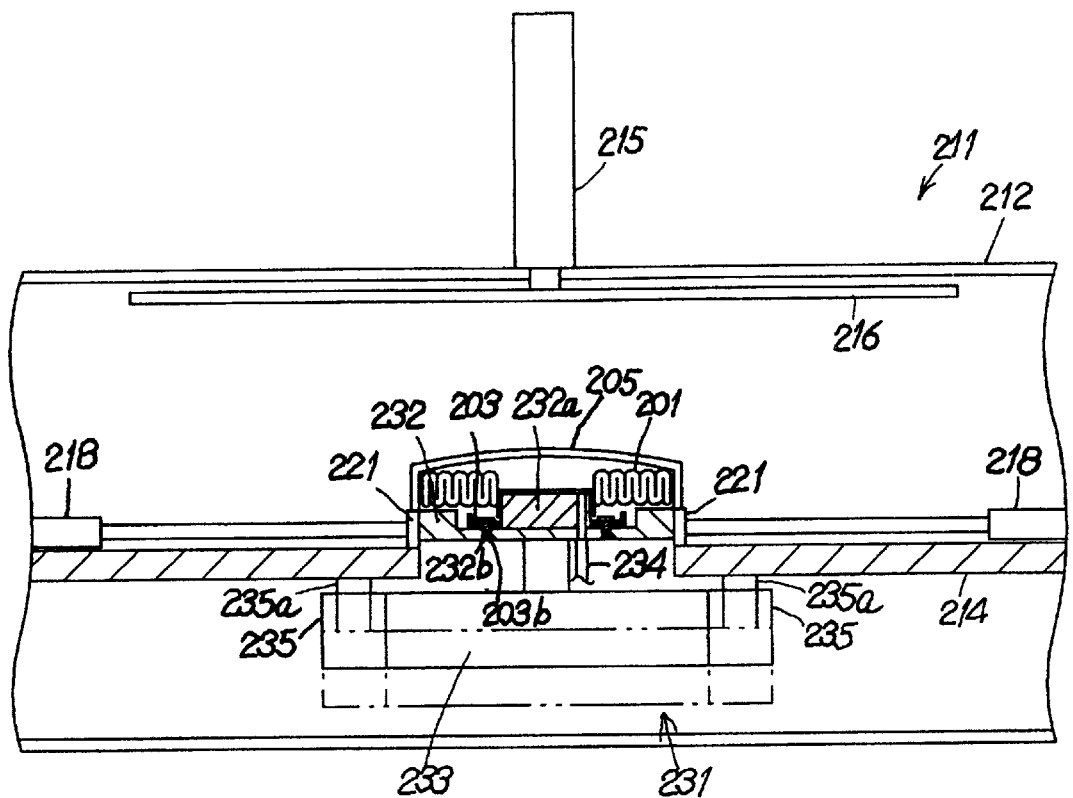
FIG. 47 is a sectional view taken along the line I—I in FIG. 36 to illustrate the same, showing the step subsequent to that shown in FIG. 46.
Figure 48:
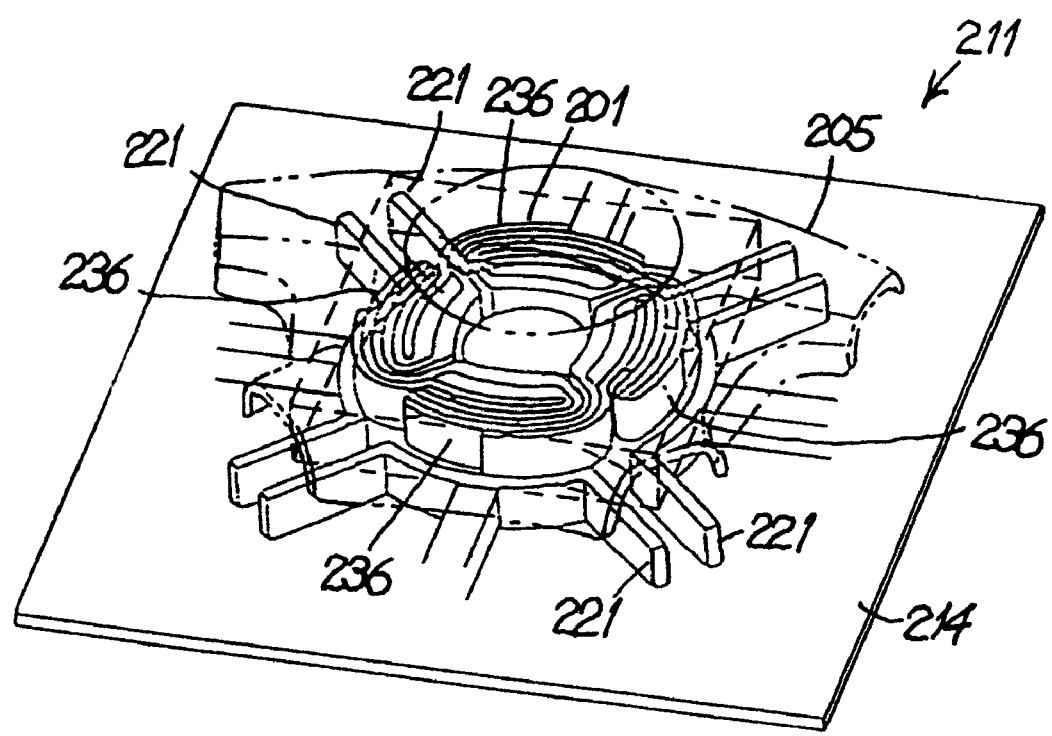
FIG. 48 is a perspective of the same.

In the process shown in FIGS. 46 to 48, the pushing cylinders 235 alone serve as the insertion means, and when the folded air bag 201 is inserted into the cover 205, the operator places the cover 205 on a given location by hand and holds it there. However, either or both these placement and holding may be done by using an industrial robot.

According to the above embodiment, an air bag attaching portion 231 including a rotary actuator 233 is provided as the winding means. However, the winding means may be comprised of plates adapted to advance inward and retreat outward so as to push the radially arranged lug portions 236 and wind them around the outer face of the folded portion, or the winding may be done by human hand without providing a particular means.

Figure 49:
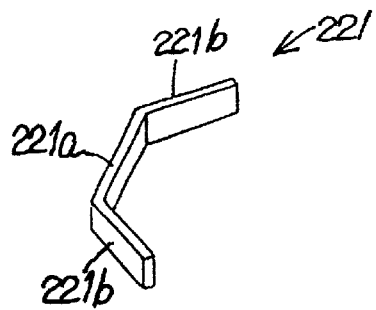
FIG. 49 is a perspective view of a pushing means according to another embodiment of the invention.

Furthermore, according to the above embodiment, each pushing member 221 serving as a pushing means has a structure shown in FIG. 36, wherein the center portion 221a corresponding to a side of the final folded shape of an air bag is formed in an arc that curves outward when viewed from the top, and each lug forming portion 221b corresponding to a lug forming plate 223 is formed in a straight line when viewed from the top. However, the pushing members 221 may be in various shapes, such as the one shown in FIG. 49 where the center portion 221a is formed in a straight line when viewed from the top.

Figure 50:
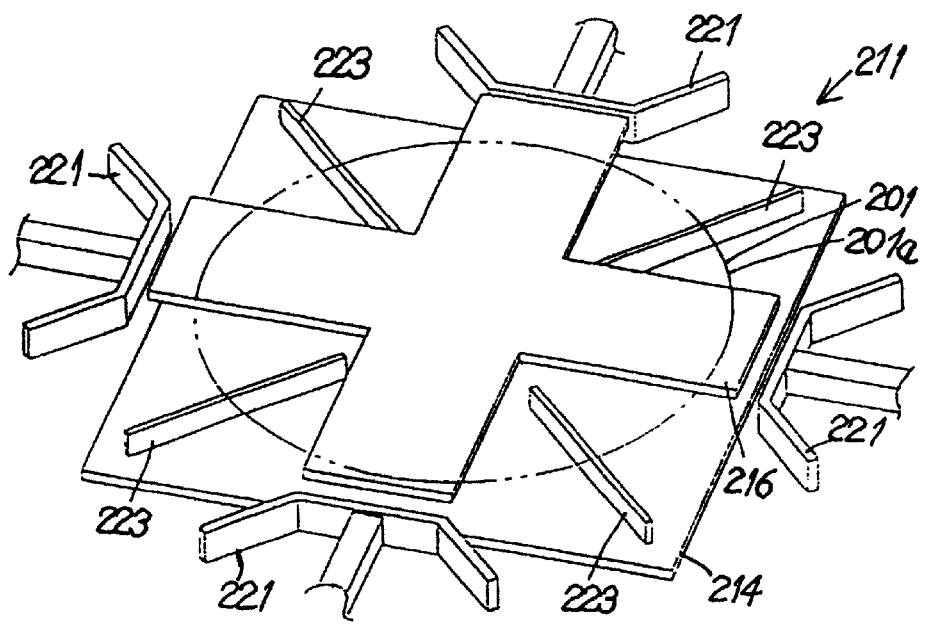
FIG. 50 is a perspective view of a height limiting means according to another embodiment of the invention.

Although the upper plate 216 serving as the height restricting means is in such a shape as to cover the entire upper surface of the air bag in the spread out state as shown in, for example, FIG. 39 according to the embodiment described above, it is not always necessary to cover the entire upper surface of the air bag; for example, the same effect in folding the air bag 201 into a wave-like pattern can be achieved by a structure shown in FIG. 50 where the portions above the respective lug forming plates 223 are removed so that the upper plate 216 covers only the areas traveled by the center portions 221a of the pushing members 221 that fold the air bag 201.

Figure 51:
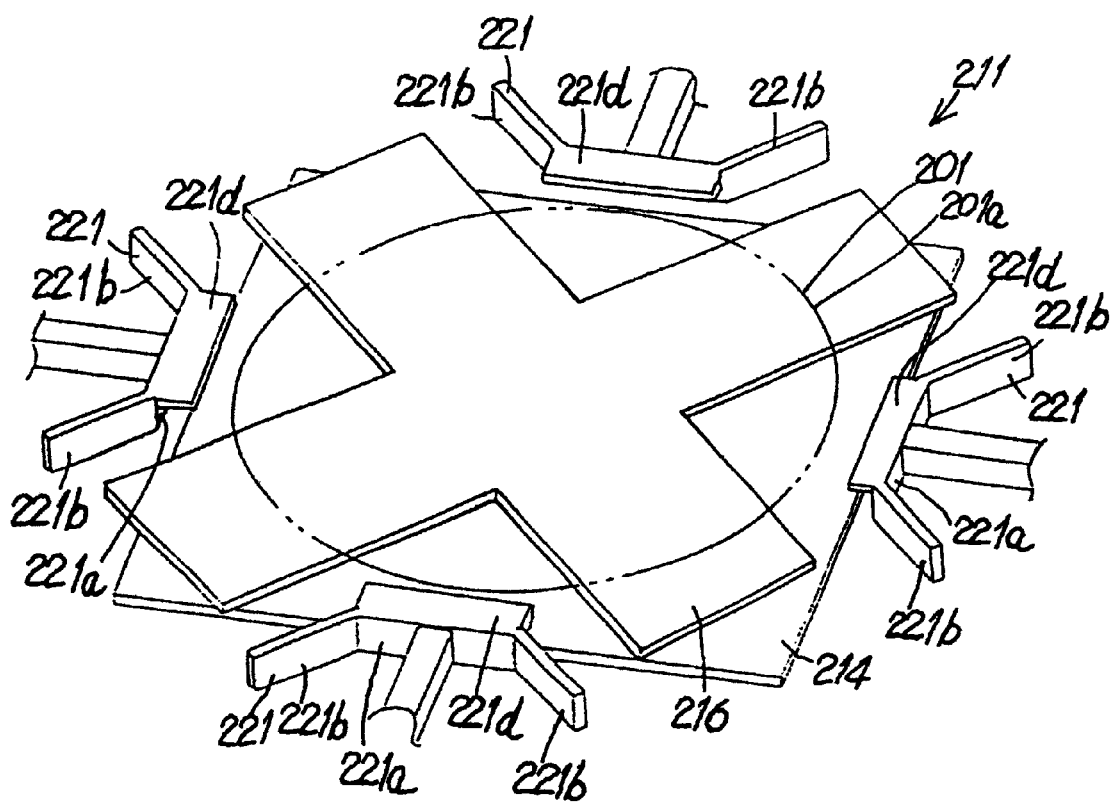
FIG. 51 is a perspective view of a height limiting means according to yet another embodiment of the invention.
Figure 52:
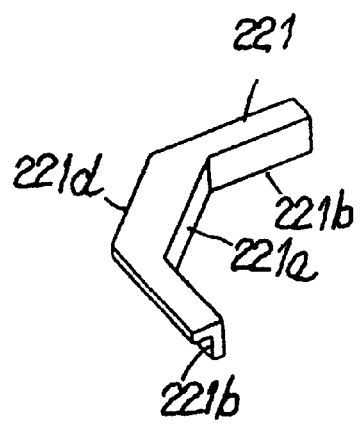
FIG. 52 is a perspective view of a height limiting means according to yet another embodiment of the invention.

Furthermore, the height restricting means is not limited to an upper plate 216, which is a single plate. The same effect in folding the air bag 201 into a wave-like pattern can be achieved by, for example, a structure shown in FIG. 51, where the height restricting means is comprised of an upper plate 216 and projecting portions 221d, wherein the portions of the upper plate 216 respectively located above the areas traveled by the pushing members 221 are cut out, and each projecting portion 221d is in the shape of a generally rectangular plate that projects forward like a flange from the top of the center portion 221a of each respective pushing member 221. Further, the shape of each projection portion 221d is not limited to the one shown in FIG. 51, but various shapes are applicable, such as the one with its end curved toward the center in the shape of an arc, and the one shown in FIG. 52, wherein projection portions 221d are formed on the lug forming portions 221b, at both sides of the center portion 221a as well as on the center portion 221a. Depending on the shape of each projection portion 221d or resilience of the fabric of the air bag 201, the upper plate 216 may be omitted so that the height restricting means is constituted only by the projection portions 221d.

Although the lug forming plates 223 that move back and forth vertically from the lower plate 214 are used as the radial direction restricting means in formation of the lug portions 236 according to the above embodiment, the lug forming plates 223 may be provided at the upper plate 216. The lug portions 236 may move back and force vertically from either the lower plate 214 or the upper plate 216, or they may move radially. In yet another configuration, they may be affixed to the lower plate 214 or the upper plate 216.

Figure 53:
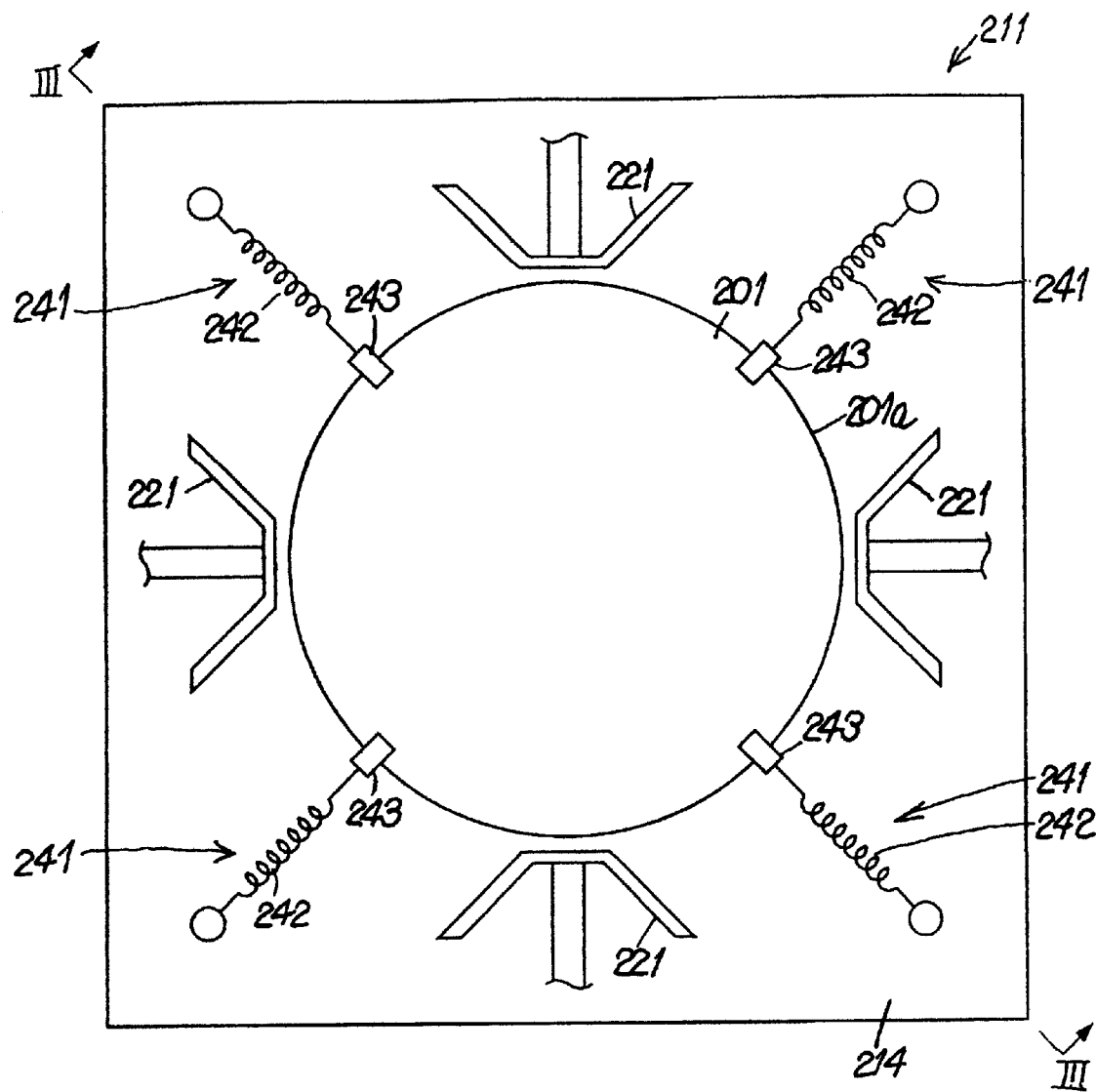
FIG. 53 is a top view of a radial position limiting means according to another embodiment of the invention.
Figure 54:
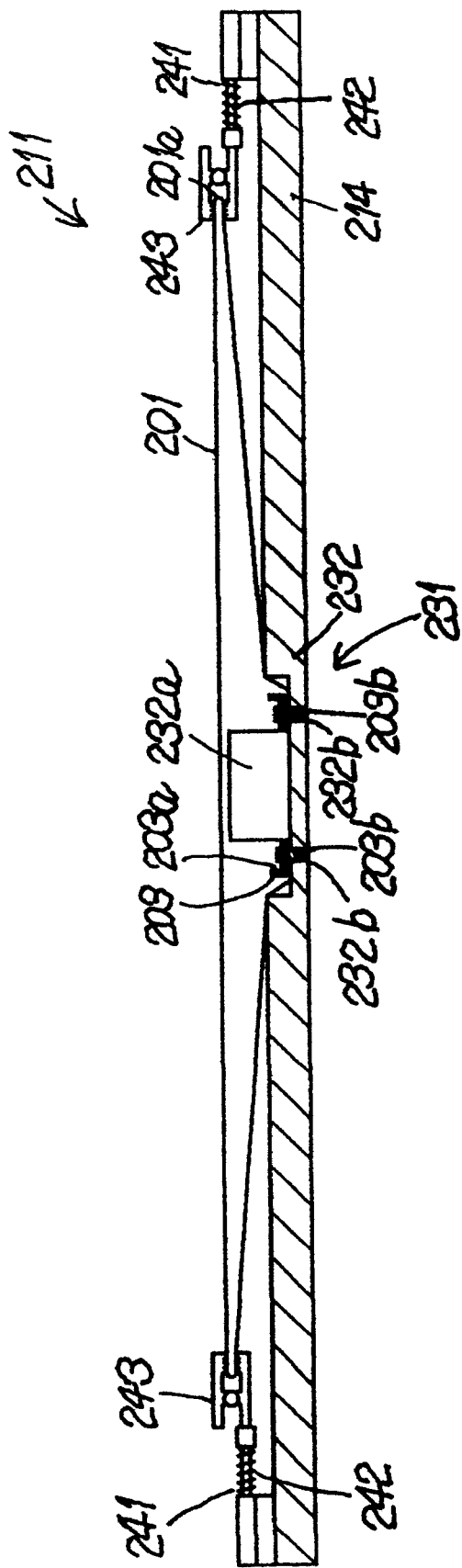
FIG. 54 is a sectional view of the same taken along the line III—III in FIG. 53.

It is not always necessary to use a plate-shaped member as the radial position restricting means, but any structure is applicable as long as it is adapted to maintain the shape of portions of the air bag which will not be pushed by the pushing members 221 so that said portions are arranged radially. For example, a clamp device 241 shown in FIGS. 53 and 54 may be used instead of the lug forming plates 223. Said clamp device 241 essentially comprises radially arranged coil springs 242 and clamp bodies 243 respectively attached to the inner ends of the coil springs 242, wherein each coil spring is disposed between each two adjacent pushing members 221 with its outer end fastened to the lower plate 214 or the like and serves as a biasing means. With the configuration as above, the lug portions 236 can be formed by advancing the pushing members 221 in the state where the vicinity of the outer perimeter 201a of the air bag 201 are pinched by the clamp bodies 243. According to the above configuration, the clamp bodies 243 are supported by their respective coil springs 242. Therefore, as the diameter of the air bag 201 decreases resulting from the motion of the pushing members 221, an appropriate force is applied in the direction of the outer perimeter of the air bag, permitting the lug portions 236 of the air bag 201 to be formed neatly without excessive stress.

Depending on the resilience or other characteristics of the air bag 201, each lug portion may be effortlessly formed between each two adjacent pushing members 221, without the need of a radial direction restricting means. Therefore, the radial direction restricting means can be omitted, as the case may be.

According to the embodiment described above, as four lug portions 236 are formed, one each at four locations, by means of the respective four pushing members 221, an air bag can be folded into a shape that fits to a cover 205 having a generally square storage portion when viewed from the top. Depending on the shape of the storage portion of the cover or other conditions, however, lug portions may be formed at two, three or more than five locations. By providing three each or more pushing members 221 and lug forming plates 223, in other words by forming lug portions at three or more locations, the air bag can be easily folded in such a shape as to be smoothly inserted into a generally polygonal storage portion of the cover 205, which is defined by the mounting plate portion 205*b* of the cover 205.

Industrial Applicability

As described above, the present invention relates to an air bag system, a method of folding the air bag to be installed in said air bag system, and a folding apparatus for such an air bag, said air bag system being adapted to be installed in, for example, the steering wheel, the instrument panel, a seat or a door panel of a vehicle and protect the occupant from the shock of a collision.

What is claimed is:

1. A method of folding an air bag adapted to be unfolded and inflated by gas blown thereinto, comprising the steps of:

providing an uninflated air bag of flat outline shape;

forming a gas insertion portion in the air bag;

folding the air bag into an annular wave-like shape;

pushing the wave-like shaped air bag inwardly from a peripheral edge thereof to form at least three side portions of a rectangular outline leaving an excess portion between each two adjacent side portions; and placing at least a part of each excess portion along an outer face of at least one of the two adjacent side portions of which it is between.

2. An air bag folding method as claimed in claim 1, in which the folding comprises producing plural folds in the air bag that constitute the side portions and each excess portion, the folds being separated by a release line portion that extends continuously from the gas insertion portion to an end of each excess portion.

3. A method of folding an air bag as claimed in claim 1 wherein:

said folding comprises pushing said air bag at a plurality of locations, from said peripheral edge towards a center while limiting the height of folds produced in the air bag by said pushing.

4. A method of folding an air bag as claimed in claim 1 wherein said folding comprises:

pushing at a plurality of locations offset and at opposing sides from one another.

5. A method of folding an air bag as claimed in claim 4 in which the folding comprises producing plural folds in the bag that constitute the side portions and each excess portion, the folds being separated by a release line portion that extends continuously from the gas insertion portion to an end of the excess portion.

6. An air bag folding method as claimed in claim 1, comprising placing another part of each excess portion along an outer face of an other of the two adjacent side portions of which it is between.

* * * * *